United States Patent
Tobita et al.

(10) Patent No.: US 6,694,133 B1
(45) Date of Patent: Feb. 17, 2004

(54) IMAGE PROVIDING SYSTEM AND METHOD

(75) Inventors: Naomi Tobita, Tokyo (JP); Fujio Ishii, Tokyo (JP)

(73) Assignee: Bandai Co., Ltd., Tokyo (JP)

( * ) Notice: Subject to any disclaimer, the term of this patent is extended or adjusted under 35 U.S.C. 154(b) by 364 days.

(21) Appl. No.: 09/580,543

(22) Filed: May 30, 2000

(51) Int. Cl.[7] .............................................. H04M 11/10
(52) U.S. Cl. ....................... 455/412; 455/422; 455/414; 455/517; 455/566
(58) Field of Search ................................ 455/412, 517, 455/566, 414, 422; 709/227, 219, 228, 231; 348/14.02

(56) References Cited

U.S. PATENT DOCUMENTS

| | | | | |
|---|---|---|---|---|
| 6,122,521 A | * | 9/2000 | Wilkinson et al. | 348/14.02 |
| 6,167,253 A | * | 12/2000 | Farris et al. | 455/412 |
| 6,247,048 B1 | * | 6/2001 | Greer et al. | 709/219 |
| 6,430,601 B1 | * | 8/2002 | Eldridge et al. | 709/231 |
| 6,473,609 B1 | * | 10/2002 | Schwartz et al. | 455/414 |

FOREIGN PATENT DOCUMENTS

| | | |
|---|---|---|
| JP | 8-32535 | 2/1996 |
| JP | 9-284529 | 10/1997 |
| JP | 10-93621 | 4/1998 |
| JP | 11-328070 | 11/1999 |
| JP | 2000-32168 A | 1/2000 |
| JP | 2000-92244 A | 3/2000 |
| JP | 2000-92569 A | 3/2000 |

* cited by examiner

*Primary Examiner*—Thanh Cong Le
*Assistant Examiner*—Lana Le
(74) *Attorney, Agent, or Firm*—Sughrue Mion, PLLC

(57) ABSTRACT

In response to a request of an image delivery from a mobile phone 4, a gateway server 2 sets a user ID corresponding to an intrinsic identifier of the mobile phone 4 in the request, and transmits it to an IP server 1. The IP server 1 receives the request from the gateway server 2, and checks right and wrong of the image delivery based on the user ID that is being set in the request, and if a result of the check indicates a user to whom the image delivery may be conducted, a requested image data is transmitted to the mobile phone 4. The mobile phone 4 receives the image data, and holds the received image data in a storage region to which access from a user is restricted.

49 Claims, 16 Drawing Sheets

FIG. 3

CONTENTS A

| USER ID | ADMISSION DATE |
|---------|----------------|
| a b c d e f g h | 2000 / 01 / 05 |
| a g h g f f f f | 2000 / 02 / 23 |
| g r h d j d l s | 2000 / 03 / 15 |
| ... ... ... | |
| k k r d f n e k | 2000 / 05 / 14 |

CONTENTS X

| USER ID | ADMISSION DATE |
|---------|----------------|
| a b c d e f g h | 2000 / 01 / 06 |
| k j g k f g g f | 2000 / 02 / 17 |
| k t e w w p v v | 2000 / 03 / 19 |
| ... ... ... | |
| j w g f l v p w | 2000 / 06 / 14 |

USER ID LIST TABLE 70

| INTRINSIC IDENTIFIER | TELEPHONE NUMBER | USER ID |
|---|---|---|
| x x x x x x | 0 9 0 - x x x x - y y y y y | a b c d e f g h |
| y y y y y y y | 0 9 0 - y y y y - x x x x x | k s f h k s f h |
| ... ... ... | ... ... ... | ... ... ... |
| z z z z z z | 0 9 0 - x x x x - z z z z z | l g g e o i v n |

FIG. 15

CONTENTS A

| USER ID | MAIL ADDRESS | ADMISSION DATE |
|---|---|---|
| abcdefgh | user@xxx.or.jp | 2000 / 01 / 05 |
| aghgffff | user12@yyy.ne.jp | 2000 / 02 / 23 |
| grhdjdls | usera@trt.ne.jp | 2000 / 03 / 15 |
| ... ... ... | | |
| kkrdfnek | userx@trt.ne.jp | 2000 / 05 / 14 |

CONTENTS X

| USER ID | MAIL ADDRESS | ADMISSION DATE |
|---|---|---|
| abcdefgh | user@xxx.or.jp | 2000 / 01 / 06 |
| kjgkfggf | useru@vvv.ne.jp | 2000 / 02 / 17 |
| ktewwpvv | userg@tru.ne.jp | 2000 / 03 / 19 |
| ... ... ... | | |
| jwgflvpw | userq@ttt.ne.jp | 2000 / 06 / 14 |

150

IMAGE PROVIDING SYSTEM AND METHOD

BACKGROUND OF THE INVENTION

1. Field of the Invention

The present invention relates to a system for an image delivery and a method thereof, and to a system that prepares a plurality of images in a server, an image is down-loaded in a mobile phone from the server, and the down-loaded image is displayed on the mobile phone.

2. Description of the Related Art

In recent years, mobile phones have received much attention. Mobile phones now function like computers, handling not only simple call functions like in a conventional phone, but also capable of being connected to a network such as an internet, and transmitting and receiving data.

People have different tastes, and mobile phones also provide a plurality of waiting screens in consideration of a user selecting a favorite screen.

However, in the mobile phone, storage capacity is restricted, and the number of images to be held is also restricted. Accordingly, images in accordance with tastes of a user are not necessarily prepared.

Further, for an image such as a character and so forth that are used on a waiting screen, copyright license fees may be charged the use thereof. In that case, a company that uses an image such as a character on a waiting screen in a mobile information processing terminal such as a mobile phone has to pay a copyright fee for the character to a copyright holder of the character that is used.

If a user does not use an image preliminarily prepared in a mobile phone, a sales company of the mobile phone still has to bear a copyright fee for a character, and the copyright fee is often wasted. As a result, this causes an increase in a cost of the mobile phone.

Accordingly, a service for delivering an image that can be used on a waiting screen is proposed.

However, this service is only for simply delivering an image, and the delivered image can be delivered to other mobile phones again and can be processed, and potential of copyright infringement occurs.

SUMMARY OF THE INVENTION

The objective of the present invention is to solve the tasks.

Also, the objective of the present invention is to provide an image delivering system for promoting protection of a copyright and capable of delivering an image in accordance with a taste of a user, and a method thereof.

Moreover, the objective is to provide an image delivering system capable of providing conventional pull type service with push type image delivery service, and a method thereof.

The present invention provides an image delivering system having a mobile communication network, a plurality of mobile phones connected to the mobile communication network, a first server connected to the mobile phones via the mobile communication network, a network, and a second server connected to the first server via the network. The mobile phones have display means for displaying an image, and storage means having a region to which access control is applied. The mobile phone further comprises member registration demand means for transmitting a member registration demand for image delivery service, and image delivery demand means for transmitting an image delivery demand. The mobile phone further comprises image selecting means for transmitting image selection information for selecting a desired image data from a plurality of image data stored in the second server, and for down-loading the desired image data. The mobile phone further comprises hold means that store the down-loaded image data in the access controlled region of the storage means, and image controlling means for displaying the down-loaded image on the display means.

The first server comprises a user identifier table in which intrinsic identifiers of the mobile phones, and user identifiers that correlate to these intrinsic identifiers. The first server further comprises means for retrieving the user identifiers corresponding to the intrinsic identifiers of the mobile phones from the user identifier table, converting the intrinsic identifiers into user identifiers, and transmitting a demand from the mobile phones to the second server.

The second server comprises storage means in which a image data to be delivered is stored, and a member list table in which user identifiers of members of image delivery service are described. The second server further comprises member registration means for, when receiving a member registration demand from the first server, determining whether a user identifier that is set to this member registration demand is described in the member list table. The second server further comprises image list transmitting means for, when receiving the image delivery demand, determining whether a user identifier that is set to this image delivery demand is described in the member list table, and for transmitting a list of a deliverable image. The second server further comprises image delivering means for reading out image data indicated in the image selection information from the storage means, and for transmitting it to the mobile phones.

In accordance with the present invention, since an image data to be delivered is held in an access controlled storage means, the read-out image is held in storage means in which it cannot be delivered to others again or cannot be processed, and protection of a copyright of the delivered image can be promoted.

In addition, it is preferable that the image to be delivered is updated every day.

In another aspect of the invention, if the mobile phones have means for transmitting information on sorts of their own phones, and the second server has storage means in which an image data for every sort of the mobile phones is held, and image delivering means for reading out an image data corresponding to information on the sorts of the mobile phones from the storage means, and for transmitting it to the mobile phones via the first server, display inconvenience due to a difference of the sorts of the mobile phones can be avoided.

In another aspect of the invention, the first server further comprises a table of information on sorts of the phones, in which the intrinsic identifiers of the mobile phones and information on sorts of the mobile phones are described in association with each other. The first server further comprises means for, in response to a demand from the mobile phones, retrieving the information on the sorts of the mobile phones from the table of information on the sorts of the phones, based on the intrinsic identifiers added to the demand, for adding this information on the sorts of the phones to the demand, and for transmitting it.

The second server further comprises storage means in which an image data for every sort of the mobile phones is held, and image delivering means for reading out an image data corresponding to the information on the sorts of the phones, which is added to the demand, from the storage means, and for transmitting it to the mobile phones via the first server. In this way, an advantage same as in the arrangement can be obtained.

In another aspect of the invention, the second server further comprises an address table in which electronic mail addresses of members are described, means for concurrently transmitting electronic mails in which a destination to be linked for down-loading a deliverable image data is set to addresses described in the address table, and means for responding to access based on a link from the electronic mails and transmitting the image data to the mobile phones. The mobile phones further comprise have electronic mail transmitting and receiving means for transmitting and receiving an electronic mail, and access means for receiving an electronic mail by means of the electronic mail transmitting and receiving means, and for having access to the destination to be linked, which is set in the electronic mail, image display controlling means for displaying an image down-loaded from the destination to be linked on the display means. The mobile phones further comprise hold means for holding the image down-loaded from the place to be linked in an access-controlled region of the storage means, thereby providing push type service can be provided, and further, it is possible for a user to save time for reading out a menu of an image delivery one by one.

In another aspect of the invention, the mobile phones further comprise have member registration demand means for transmitting a member registration demand of mail delivery service, electronic mail transmitting means which is started by means of the second server, and means for setting a mail address of the second server, which is provided from the second server, in a destination to which an electronic mail will be transmitted, when the electronic mail transmitting means is started, for setting a mail address of a user in an origin of transmission, and for setting a mail identifier provided from the second server in an electronic mail and transmitting it to a destination of transmission.

The second server further comprises means for, when receiving the member registration demand, generating a mail identifier which has a relationship in pairs with a user identifier of a member who transmitted the member registration demand, and means for starting the electronic mail transmitting and receiving means of the mobile phones and for transmitting the mail address and the mail identifier of the second server to the mobile phones. The second server further comprises means for receiving an electronic mail, specifying a user identifier from the mail identifier that is set in the electronic mail, and describing the specified user identifier and the mail address of a user, which is set in the electronic mail, in the address table in pairs, even in a mail interface, a mail address coincident with a user ID can be exactly obtained.

The present invention also provides an image delivering system comprising a mobile communication network, a plurality of mobile phones connected to the mobile communication network, a first server connected to the above-described mobile phones via the mobile communication network, a network, and a second server connected to the first server via the network.

The first server comprises means for connecting the mobile phones to the network.

The second server comprises storage means for holding an image data, an address table in which electronic mail addresses of members of image delivery service are described, means for concurrently transmitting electronic mails in which a destination to be linked for transmitting a deliverable image data is set to addresses described in the address table, and means for transmitting the image data to the mobile phones based on a link that is set in the electronic mails.

The mobile phones comprise display means for displaying an image, electronic mail receiving means for receiving an electronic mail, access means for receiving an electronic mail by means of the electronic mail receiving means, and for having access to a destination to be linked, which is set in the electronic mail, and image display controlling means for displaying an image down-loaded from the destination to be linked on the display means.

In accordance with the present invention, push type image delivery service can be provided, which is not in the conventional pull type service.

In addition, it is preferable that the image to be delivered from the destination to be linked is an updated image.

In another aspect of the invention, the mobile phones further comprise member registration demand means for transmitting a member registration demand of mail delivery service, and electronic mail transmitting means which is started by means of the second server. The mobile phones further comprise means for setting a mail address of the second server, which is provided from the second server, in a destination to which an electronic mail will be transmitted, when the electronic mail transmitting means is started, for setting a mail address of a user in an origin of transmission, and for setting a mail identifier provided from the second server in an electronic mail and transmitting it to a destination of transmission.

The second server further comprises means for, when receiving the member registration demand, generating a mail identifier which has a relationship in pairs with a user identifier of a member who transmitted the member registration demand, means for starting the electronic mail transmitting and receiving means of the mobile phones, and for transmitting the mail address and the mail identifier of the second server to the mobile phones. The second server further comprises means for receiving an electronic mail, for specifying a user identifier from the mail identifier that is set in the electronic mail, and for describing the specified user identifier and the mail address of a user, which is set in the electronic mail, in the address table in pairs, even in a mail interface, a mail address coincident with a user ID can be exactly obtained.

In another aspect of the invention, the mobile phones have means for transmitting information on sorts of their own phones.

The second server further comprises storage means in which an image data for every sort of the mobile phones is held, and image delivering means for reading out an image data corresponding to information on the sorts of the mobile phones from the storage means, and for transmitting it to the mobile phones via the first server.

In another aspect of the invention, the first server further comprises a table of information on sorts of the phones, in which intrinsic identifiers of the mobile phones and information on sorts of the mobile phones are described in association with each other. The first server further comprises means for, in response to a demand from the mobile phones, retrieving the information on the sorts of the mobile phones from the table of information on the sorts of the phones, based on the intrinsic identifiers added to the demand, and for adding this information on the sorts of the phones to the demand, and transmitting it.

The second server further comprises storage means in which an image data for every sort of the mobile phones is held, and image delivering means for reading out an image data corresponding to the information on the sorts of the phones, which is added to the demand, from the storage means, and for transmitting it to the mobile phones via the first server.

In another aspect of the invention, the mobile phones further comprise storage means having an access-controlled region, and hold means for holding a down-loaded image data in the access-controlled region of the storage means for copyright protection.

The present invention also provides an image delivering method in a network system comprising a mobile communication network, a plurality of mobile phones connected to the mobile communication network, a first server connected to the mobile phones via the mobile communication network, a network, and a second server connected to the first server via the network.

The method comprises, in response to a request of an image delivery from the mobile phones, the first server sets a user identifier corresponding to an intrinsic identifier of the mobile phones in the request, and transmitting it to the second server. The method further comprises the second server receives the request from the first server, determining if the image delivery is correct based on the user identifier that is set in the request, and transmitting a requested image data to the mobile phones if a result of the check indicates a user to whom an image delivery may be conducted. The method further comprises the mobile phones receiving the image data, and holding the received image data in an access-controlled storage region to which access from a user is restricted.

In another aspect of the invention, the method further comprises holding image data for every sort of the mobile phones in the second server, and, when transmitting a request, the mobile phones adding information on sorts of their own phones thereto and transmitting it. The method further comprises the second server delivering image data corresponding to the information on the sorts of the mobile phones to the mobile phones to avoid display inconvenience.

In another aspect of the invention, the method further comprises generating a table of information on sorts of the phones in the first server, in which the intrinsic identifiers of the mobile phones and information on sorts of the mobile phones are described in association with each other, and holding an image data for every sort of the mobile phones in the second server. The method further comprises, in response to a request from the mobile phones, the first server retrieving the information on the sorts of the mobile phones from the table of information on the sorts of the phones, based on the intrinsic identifiers added to the request, and adding this information on the sorts of the phones to the demand, and transmitting the information it to the second server. The method further comprises the second server delivering image data corresponding to the information on the sorts of the mobile phones to the mobile phones based on the information on the sorts of the phones, which is added to the request.

In another aspect of the invention, the method further comprises providing an address table in the second server, in which electronic mail addresses of members to whom electronic mails are delivered, and concurrently transmitting from the second server electronic mails in which a destination to be linked for down-loading a deliverable image data is set to addresses described in the address table. The method further comprises receiving an electronic mail, having access to the destination to be linked, which is set in the received electronic mail, down-loading an image data, and displaying an image of the down-loaded image data.

In another aspect of the invention, the method further comprises the mobile phones transmitting a registration request of an electronic mail address, the first server setting a user identifier in the registration request, and the second server generating a presumptive identifier which has a relationship in pairs with the user identifier that is set in the registration request. The method further comprises transmitting the presumptive identifier and the electronic mail addresses of the second server to the mobile phones, and of starting a function of an electronic mail of the mobile phones, setting an electronic mail address of a user in an origin of transmission of an electronic mail on the mobile phones, setting the electronic mail addresses of the second server in a destination to which the electronic mail is transmitted, and setting the presumptive identifier in the electronic mail. The method further comprises transmitting the electronic mail from the mobile phones, in which the presumptive identifier is set, the second server extracting the presumptive identifier from the received electronic mail, and retrieving a user identifier which has a relationship in pairs with the presumptive identifier, and registering the electronic mail address of a user, which is described in an origin of transmission of the received electronic mail, and the retrieved user identifier in the address table in pairs, even in a mail interface, a mail address coincident with a user ID can be exactly obtained.

The present invention also provides an image delivering method in a network system comprising a mobile communication network, a plurality of mobile phones connected to the mobile communication network, a first server connected to the mobile phones via the mobile communication network, a network, and a second server connected to the first server via the network.

The method comprises concurrently transmitting electronic mails in which a destination to be linked for down-loading an image to be delivered is set to previously registered electronic mail addresses that are destinations of the transmission, and receiving an electronic mail, and requesting to deliver an image to a destination to be linked, which is set in the electronic mail from the mobile phones, via the first server. The method further comprises, in response to a request of an image delivery from the mobile phones, the first server setting a user identifier corresponding to an intrinsic identifier of the mobile phones in the request, and transmitting it to the second server, and the second server receiving the request from the first server, and determining if an image delivery based on the user identifier that is set in the request is correct. The method further comprises transmitting image data specified by the request to the mobile phones if a result of the check indicates a user to whom an image delivery may be conducted; and the mobile phones receiving the image data, and displaying an image of the received image data.

In accordance with the present invention, push type image delivery service can be provided, which is not in the conventional pull type service. Also, the method further comprises holding the received image data in an access-controlled storage region, thereby providing copyright protection.

Also, it is preferable that the image to be delivered is updated every day.

The method further comprises holding an image data for every sort of the mobile phones in the second server, and, when transmitting a request, the mobile phones adding information on sorts of their own phones thereto and transmitting it. The method further comprises the second server delivering image data corresponding to the information on the sorts of the mobile phones to the mobile phones, thereby avoiding display inconvenience. The method further comprises generating a table of information on sorts of the phones in the first server, in which the intrinsic identifiers of the mobile phones and information on sorts of the mobile phones are described in association with each other, and holding an image data for every sort of the mobile phones in the second server. The method further comprises, in response to a request from the mobile phones, the first server retrieving the information on the sorts of the mobile phones from the table of information on the sorts of the phones, based on the intrinsic identifiers added to the request, and adding this information on the sorts of the phones to the demand, and transmitting it to the second server. The method further comprises the second server delivering image data corresponding to the information on the sorts of the mobile phones to the mobile phones based on the information on the sorts of the phones, which is added to the request. The method further comprises the mobile phones transmitting a registration request of an electronic mail address, and the first server setting a user identifier in the registration request. The method further comprises the second server generating a presumptive identifier which has a relationship in pairs with the user identifier that is set in the registration request, and transmitting the presumptive identifier and the electronic mail addresses of the second server to the mobile phones. The method further comprises starting a function of an electronic mail of the mobile phones, setting an electronic mail address of a user in an origin of transmission of an electronic mail on the mobile phones, setting the electronic mail addresses of the second server in a destination to which the electronic mail is transmitted, setting the presumptive identifier in the electronic mail, and transmitting the electronic mail from the mobile phones, in which the presumptive identifier is set.

The method further comprises the second server extracting the presumptive identifier from the received electronic mail, and retrieving a user identifier which has a relationship in pairs with the presumptive identifier, and registering the electronic mail address of a user, which is described in an origin of transmission of the received electronic mail, and the retrieved user identifier in pairs, even in a mail interface, a mail address coincident with a user ID can be exactly obtained.

The present invention also provides a method of acquiring electronic mail addresses in accordance with terminal identifiers, wherein terminals, and a second server connected to the terminals via a first server are provided, and wherein a first communication method in which the second server discriminates the terminals based on the terminal identifiers of the terminals, which are issued from the first server, and a second communication method in which the second server discriminates the terminals based on electronic mail addresses of the terminals coexist.

The method comprises the terminals transmitting a registration demand of an electronic mail address based on the first communication method, the first server setting a terminal identifier in the registration demand, and the second server generating a presumptive identifier which has a relationship in pairs with the terminal identifier that is set in the registration demand. The method further comprises transmitting the presumptive identifier and electronic mail addresses of the second server to the terminals based on the first communication method, starting a function of an electronic mail of the terminals, setting electronic mail addresses of the terminals in an origin of transmission of an electronic mail on the terminals, setting the electronic mail addresses of the second server in a destination to which the electronic mail is transmitted, setting the presumptive identifier in the electronic mail, and transmitting the electronic mail from the terminals based on the second communication method, in which the presumptive identifier is set. The method further comprises the second server extracting the presumptive identifier from the received electronic mail, and retrieves a terminal identifier which has a relationship in pairs with the presumptive identifier, and storing the electronic mail addresses of the terminals, which are described in an origin of transmission of the received electronic mail, and the retrieved terminal identifier in pairs.

In addition, the terminal identifiers of the terminals can be also used for the presumptive identifier.

BRIEF DESCRIPTION OF THE DRAWINGS

FIG. 3 is a view showing one example of a member list table,

FIG. 7 is a view showing one example of a user ID list table, FIG. 15 is a view showing one example of a mail delivery member list table.

DETAILED DESCRIPTION OF THE INVENTION

A first embodiment of the present invention will be explained.

Figure 1:
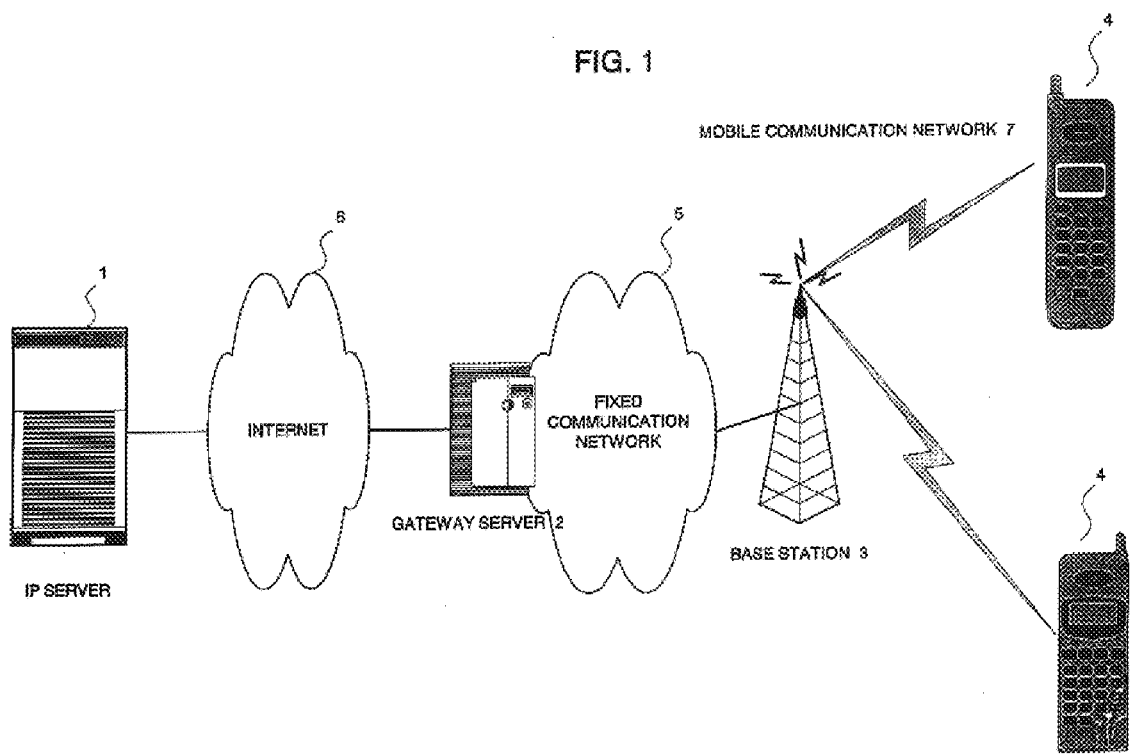
FIG. 1 is a block diagram of a first embodiment of the present invention.

FIG. 1 is a block diagram of the first embodiment.

In FIG. 1, an image delivering system comprising an information provider server 1 (IP server) for providing contents, a gateway server 2, a base station 3, a plurality of mobile phones 4, a fixed communication network 5 on a side of the gateway server 2, a communication network 6 (internet) for connecting the gateway server 2 to the IP server 1, and a mobile communication network 7 is illustrated.

Next, each of the elements will be explained.

First, the IP server 1 will be explained in detail.

Figure 2:
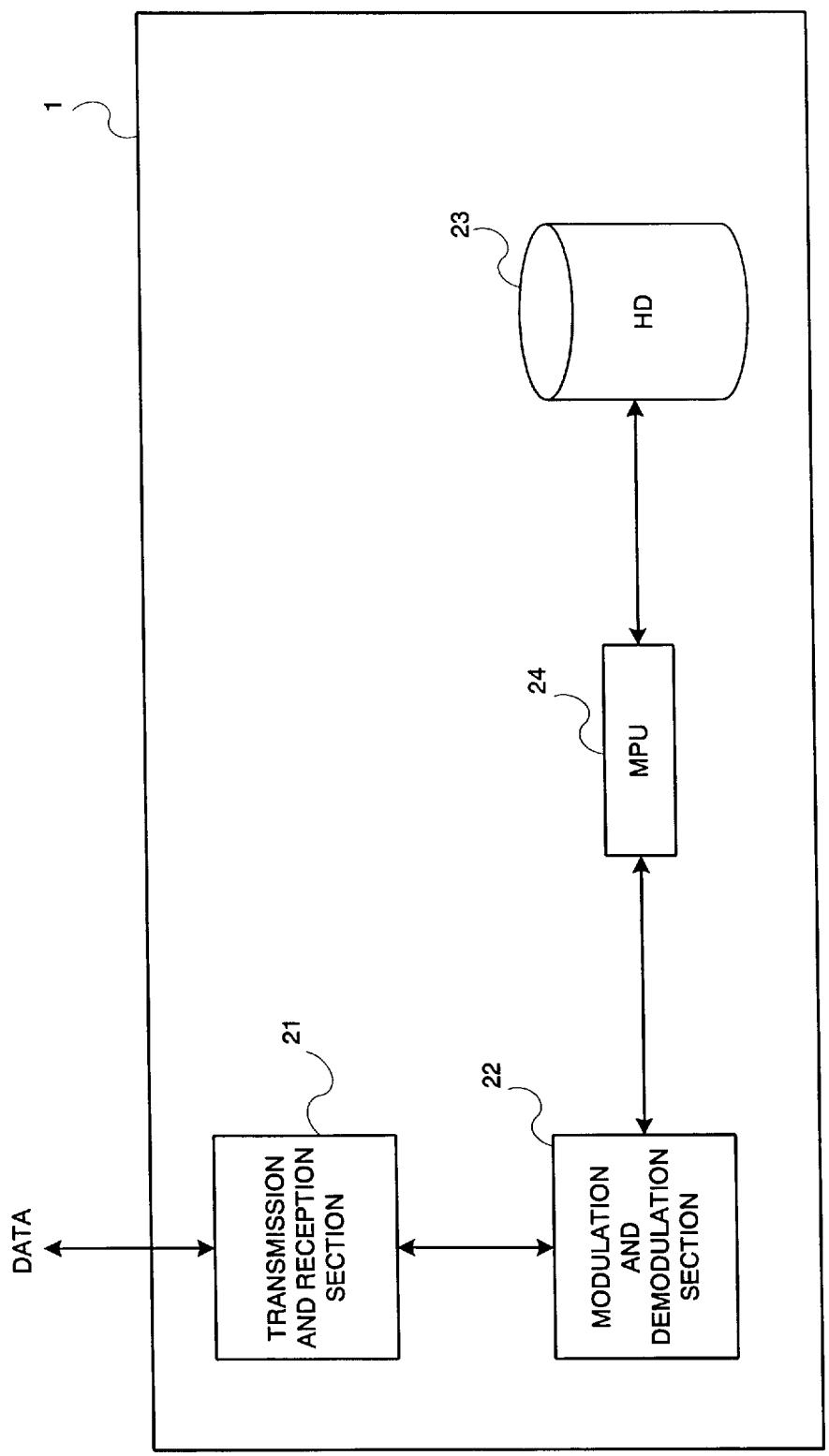
FIG. 2 is a block diagram of information provider server.

FIG. 2 is a block diagram of the IP server 1. In FIG. 2, a transmission and reception section 21 for conducting transmission and reception of a data, a modulation and demodulation section 22 for modulating and demodulating the transmitted and received data in the transmission and reception section 21, a hard disk 23 in which a program, a user list, an image data to be delivered, and so forth are stored, and an MPU 24 for conducting a process such as an HTTP request and an HTTP response in accordance with the program stored in the hard disk 23 are illustrated.

In the hard disk 23, a member list table 31 and an image folder 32 in which an image data to be delivered are stored.

The member list table 31 is a table in which user ID's of members of image delivery service, and an admission date when a member registration is made are described. The user ID is an identifier for specifying a user, and is transmitted from the gateway server 2 that will be mentioned later. FIG. 3 is a view showing one example of the member list table 31, and shows that contents to be provided are from contents A to contents X, and that a user ID of a member and an admission date of the member of each of the contents are described in association with each other.

Figure 4:
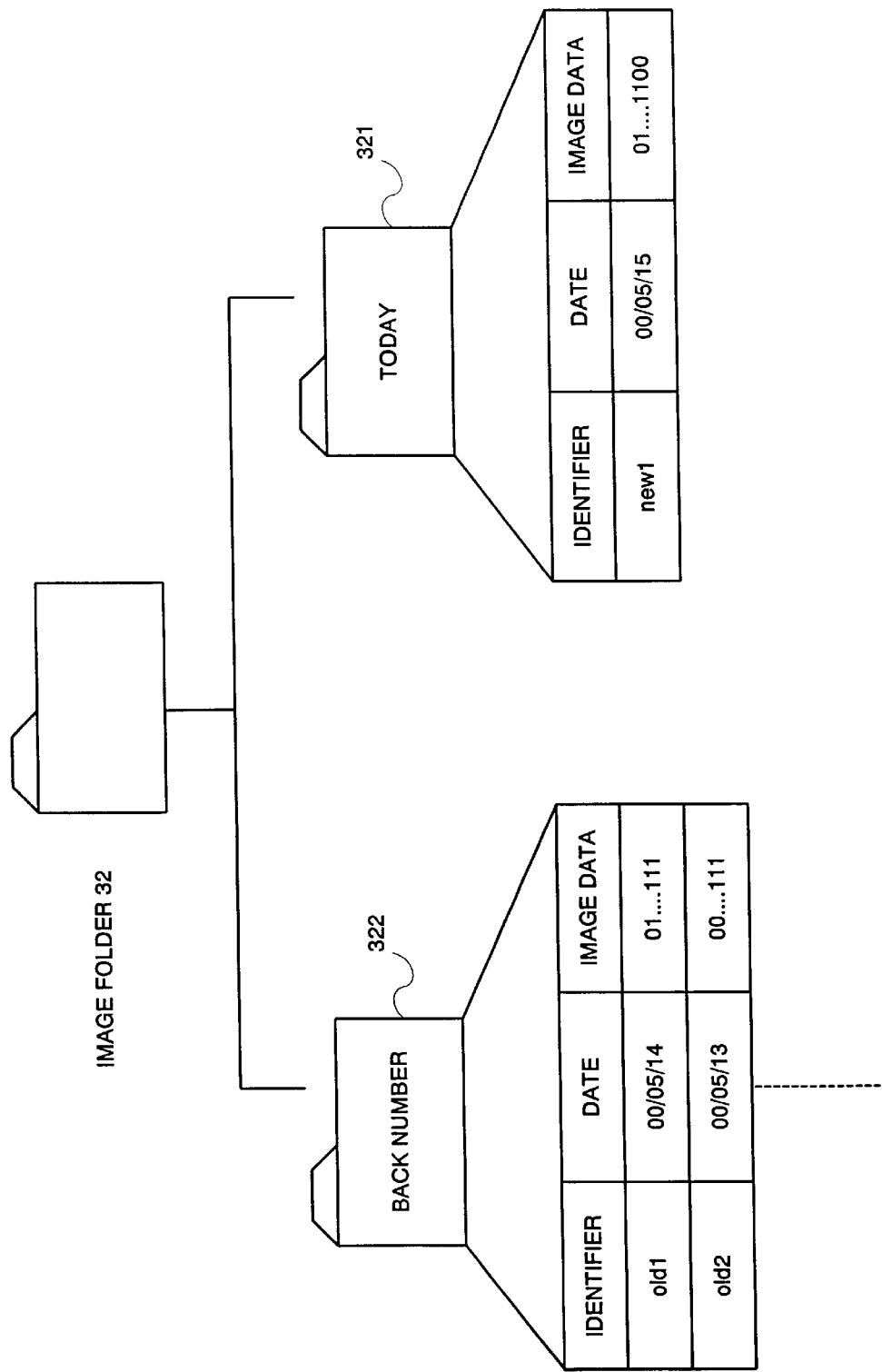
FIG. 4 is a view showing one example of an image folder.
Figure 5:
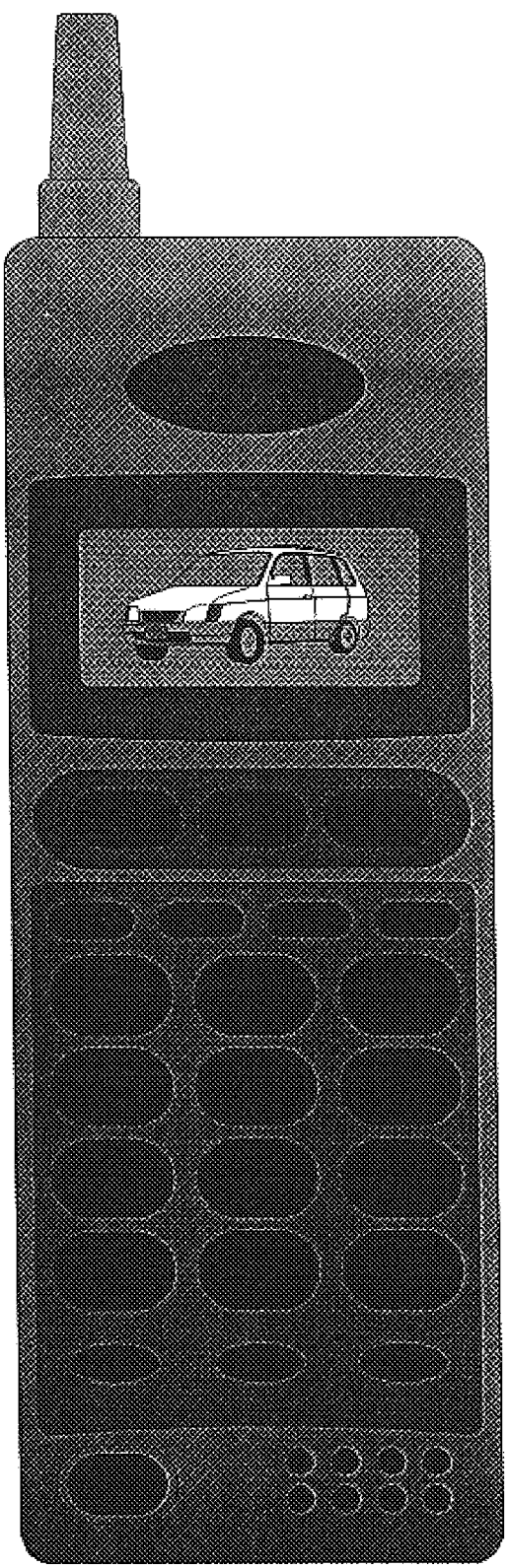
FIG. 5 is a view showing one example on how an image provided by the present invention is used.

The image folder 32 is a folder in which an image data to be delivered is held, and its directory structure is, as shown in FIG. 4, constructed of an image folder 321 for the day, in which an updated image data is held, and an image folder 322 for a back number, in which an image data of the back number is held. An image held in each folder is an image that is displayed on a display of the mobile phone 4, and for example, as shown in FIG. 5, it can be used as a waiting screen of the mobile phone 4. Also, as shown in FIG. 4, an identifier for discriminating images is allocated to each image data. In FIG. 4, it indicates an image (a character) that is held in the image folder 321 and the image folder 322 of the contents A. In addition, since an image data that is delivered in this service is added thereto every day, when an updated image data is held in the image folder 321 for the day, the image data held in the image folder 321 is moved to the image folder 322 for the back number together with the date of the image data. Also, the image data held in the image folder 322 for the back number is automatically erased after a certain period of time has passed.

Next, the gateway server 2 will be explained.

The gateway server 2 has a role of a gateway to the IP server 1, and has a role for transmitting information from the mobile phones to the IP server 1 in accordance with demands from the mobile phones 4.

Figure 6:
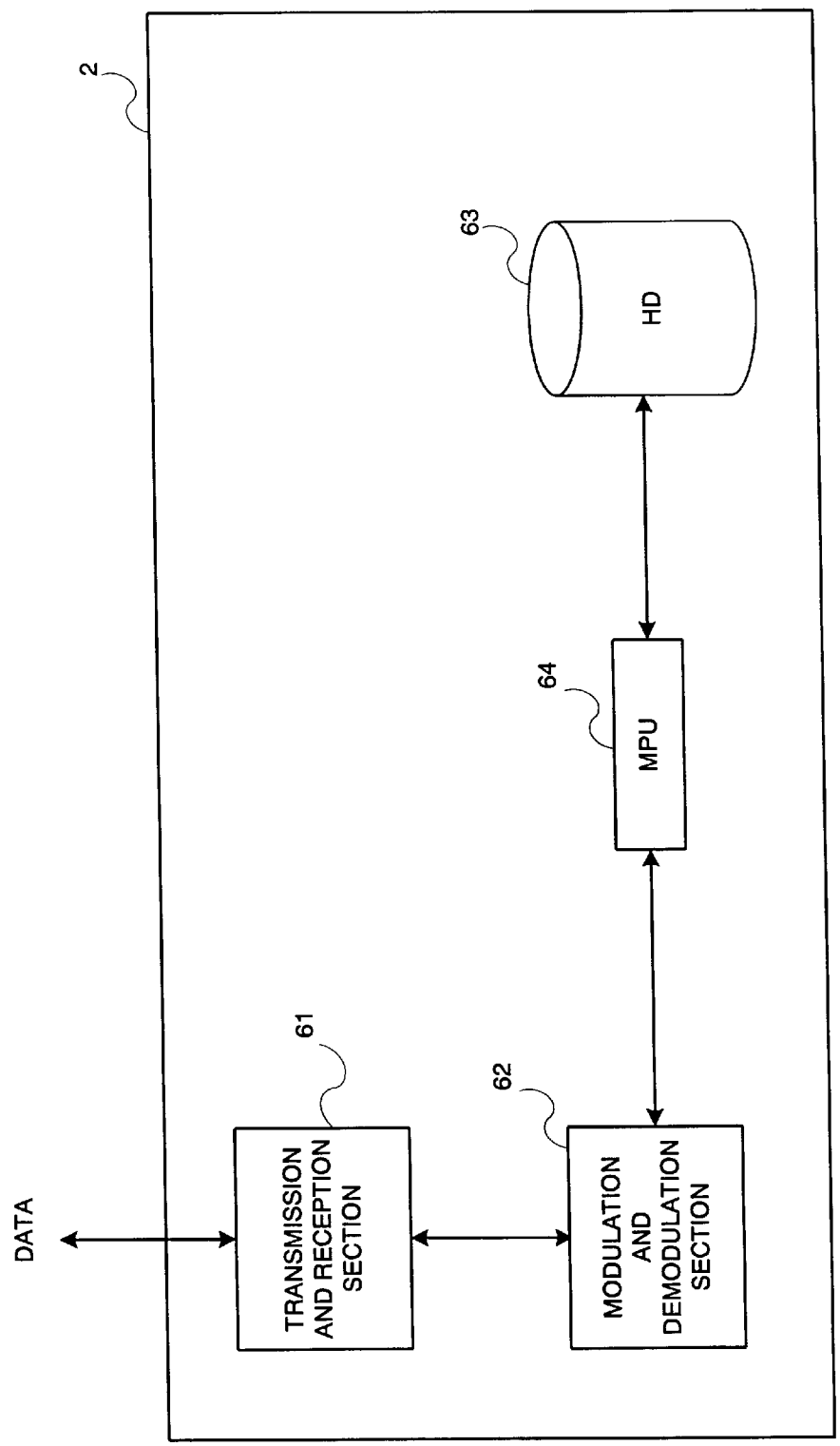
FIG. 6 is a block diagram of a gateway server.

FIG. 6 is a block diagram of the gateway server 2. In FIG. 6, a transmission and reception section 61 for conducting transmission and reception of a data, a modulation and demodulation section 62 for modulating and demodulating the transmitted and received data in the transmission and reception section 61, a hard disk 63 in which a program and so forth are stored, and an MPU 64 for conducting a process of a relay function for the mobile phones 4 and the IP server 1 in accordance with the program are illustrated.

In the hard disk 63, in addition to the program, a user ID list table 70 is held. As shown in FIG. 7, this user ID list table 70 is a table in which the telephone numbers of the mobile phones 4, intrinsic identifiers for discriminating the mobile phones 4 of these telephone numbers, and user ID's that have a relationship in pairs with these intrinsic identifiers are described in association with each other.

In a web-interface that is conducted via the gateway server 2, the gateway server 2 is constructed so as to, when a request comes from the mobile phones 4, convert the intrinsic identifier which is provided to the request of the mobile phones 4 into a user ID corresponding to this intrinsic identifier by using the user ID list table 70, and to transfer the request to the IP server 1.

In addition, as typical one of such a gateway server 2, there is an i-mode server in i-mode service that is provided by NTT DoCoMo.

Figure 8:
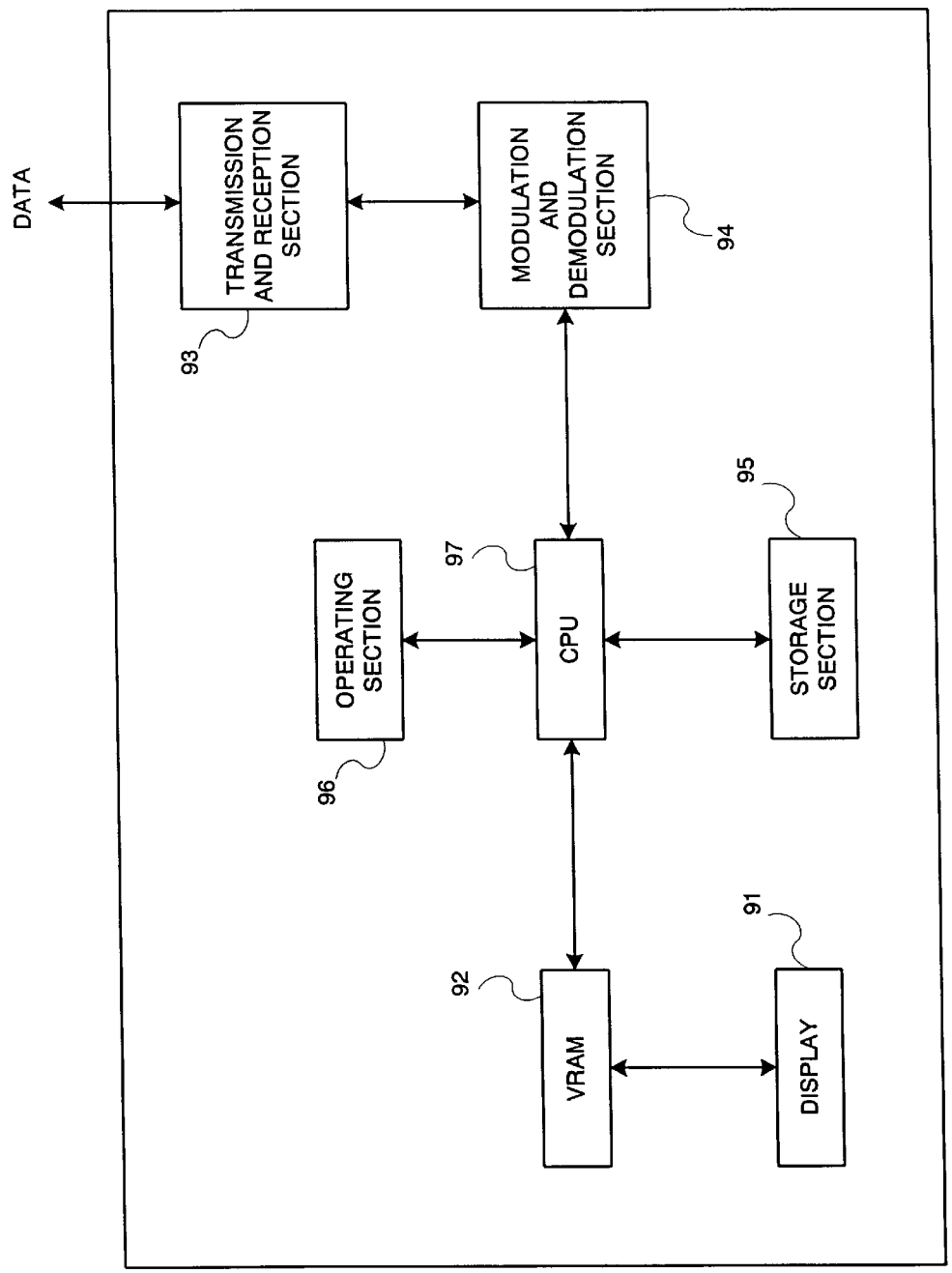
FIG. 8 is a block diagram of a mobile phone.

Next, the mobile phones 4 will be explained. FIG. 8 is a block diagram of a mobile phone 4.

The mobile phone 4 has a display 91 on which an image is displayed, a VRAM 92 (Video Random Access Memory) for displaying an image on the display 91, a transmission and reception section 93 for transmitting and receiving a data, a modulation and demodulation section 94 for conducting modulation and demodulation of a data transmitted and received in the transmission and reception section 93, a storage section 95 in which a data is held, an operating section 96 that is used for selection and so forth of an image, and a CPU 97 for conducting control of each section and a process of a data.

The mobile phone 4 is constructed so as to, in case of transmitting a request and so forth to the IP server 1, add an intrinsic identifier for discriminating self to the request and so forth, and to transmit it.

Figure 9:
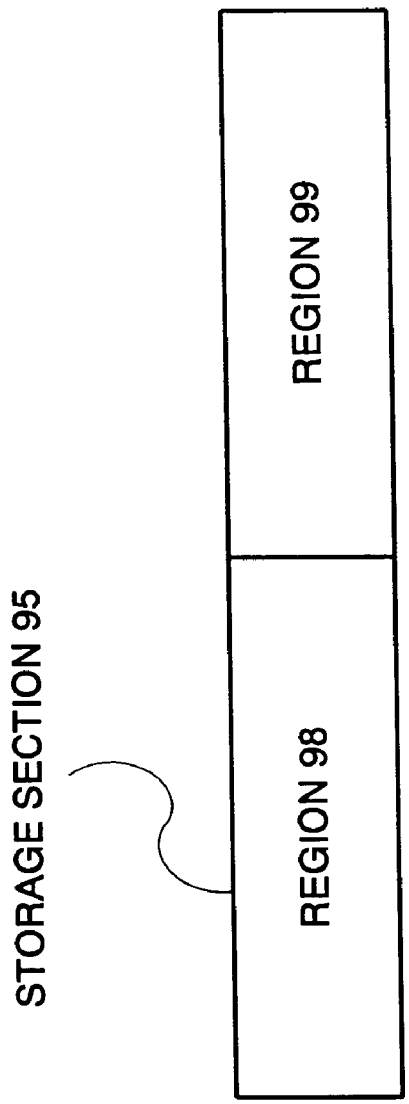
FIG. 9 is a conceptual view of a storage section.

As shown in FIG. 9, the storage section 95 is divided into a region 98 where a user of the mobile phone 4 can freely conduct reading and writing, and a region 99 where the user cannot freely conduct reading and writing. In the region 98, data such as a telephone dictionary of users and so forth are held, and writing, reading and deleting can be freely conducted by a user. On the other hand, in the region 99, reading and editing cannot be freely conducted by a user, and such data that distribution thereof to others makes the user trouble are held. For example, an image data and so forth of a character to be delivered in the service of the present invention is held in the region 99 for copyright protection purposes.

Further, the mobile phone 4 can down-load an image data via the transmission and reception section 93, which is held in the IP server 1. And, it is possible to show the down-loaded image data on the display 91, and to use it as a waiting screen. Also, the down-loaded image data can be held in the region 99 of the storage section 95, and also, can be displayed on the display 91 again under a certain condition.

Next, the operation of the embodiment of the present invention in the arrangement will be explained. In addition, in the explanation of this operation, the operation of a member registration for utilizing image delivery service and the operation for down-loading an image to the mobile phones 4 will be explained separately.

Figure 10:
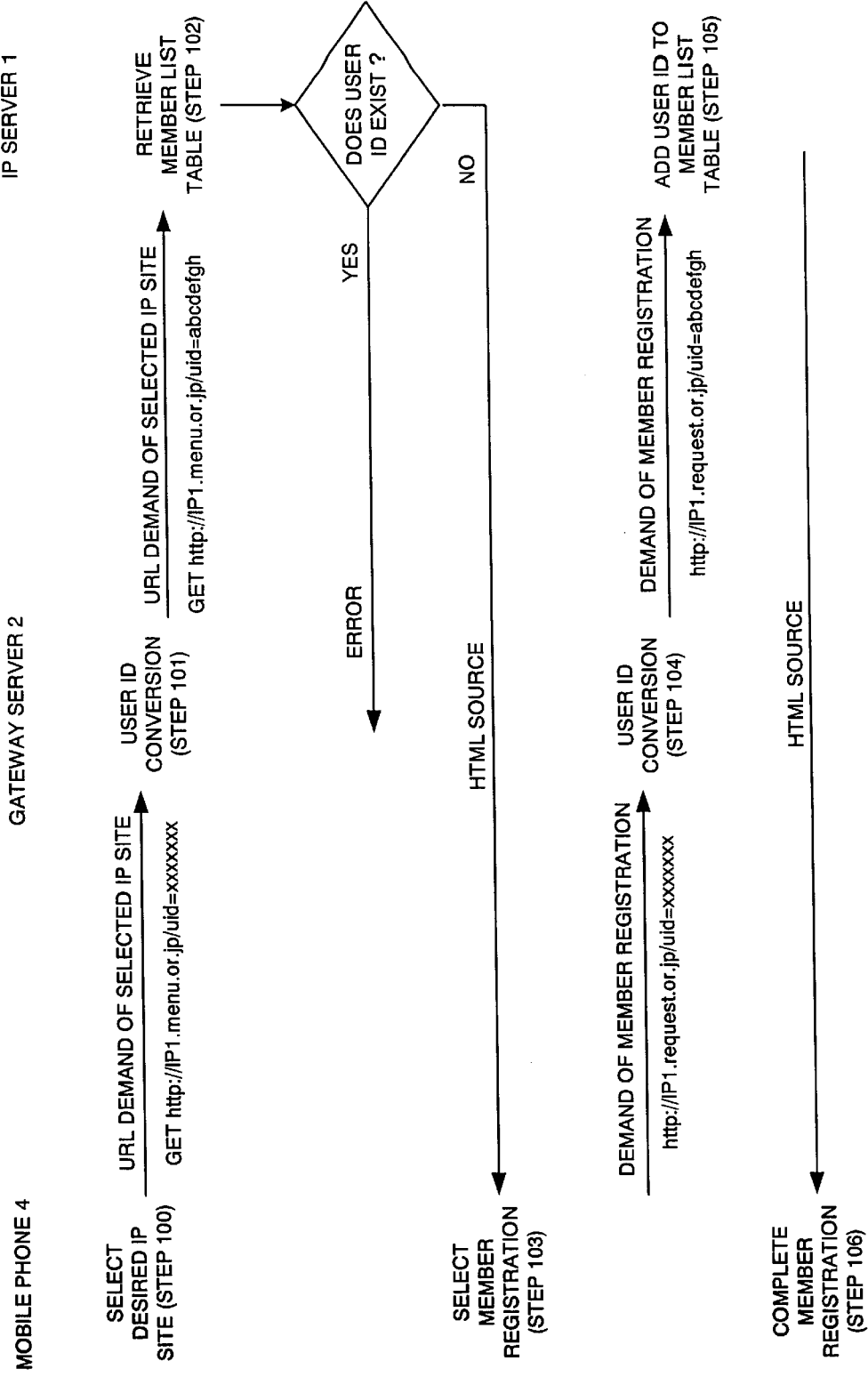
FIG. 10 is an operation flowchart of a member registration in the first embodiment.

FIG. 10 is an operation flowchart showing the operation of the member registration.

First, a user of the mobile phone 4 operates the operating section 96 of the mobile phone 4, and selects a site of the IP server 1, in which the member registration is conducted, and transmits an HTTP request (Step 100). In FIG. 10, it is shown that "GET http://IP1.menu.or.jp/uid=xxxxxxx" is transmitted from the mobile phone 4 as the HTTP request. In addition, as an example of the request, "IP1" indicates the IP server 1, "menu" indicates a menu screen of the member registration, and "xxxxxxx" out of "uid=xxxxxxx" respectively.

In the gateway server 2 that received the request, a user ID corresponding to the intrinsic identifier of the mobile phone 4 is retrieved from the user ID list table 70, and the intrinsic identifier added to the received request is converted into the retrieved user ID, and is transmitted to the IP server 1 (Step 101). In this operation, since the intrinsic identifier added to the request from the mobile phone 4 is "xxxxxxx", if a user ID corresponding to this intrinsic identifier is retrieved from the user ID list table 70, the user ID corresponding to "xxxxxxx" is "abcdefgh". Accordingly, "xxxxxxx" is converted into "abcdefgh", and "GET http://IP1.menu.or.jp/uid=abcdefgh" is transmitted to the IP server 1.

In the IP server 1, "uid=abcdefgh" out of the received request "GET http://IP1.menu.or.jp/uid=abcdefgh" is extracted, and whether or not the corresponding user ID is already registered is checked by retrieving the member list table 31. If the corresponding user ID is not described in the member list table 31, an HTML source for the member registration as a response is transmitted to the gateway server 2 (Step 102).

In the mobile phone 4, the response is received, and in accordance with instruction displayed on a screen, a request for the member registration is transmitted (Step 103). For example, as the request from the mobile phone 4, it is assumed that the request "http://IP1.request.or.jp/uid=xxxxxxx" indicates a demand of the member registration.

In the gateway server 2, the request "http://IP1.request.or.jp/uid=xxxxxxx" from the mobile phone 4 is received, and by means of the operation same as the Step 101, namely, an intrinsic identifier is converted into a user ID, and is transmitted to the IP server 1 (Step 104).

In the IP server 1, the request of the member registration from the mobile phone 4 is received, and the user ID described in the request, namely in this example, "abcdefgh" is newly described in the member list table 31, and processing of the member registration is conducted (Step 105). Thereafter, a response of completion of the member registration is transmitted to the mobile phone 4 via the gateway server 2 (Step 106).

By means of the above operation, the member registration is completed.

Figure 11:
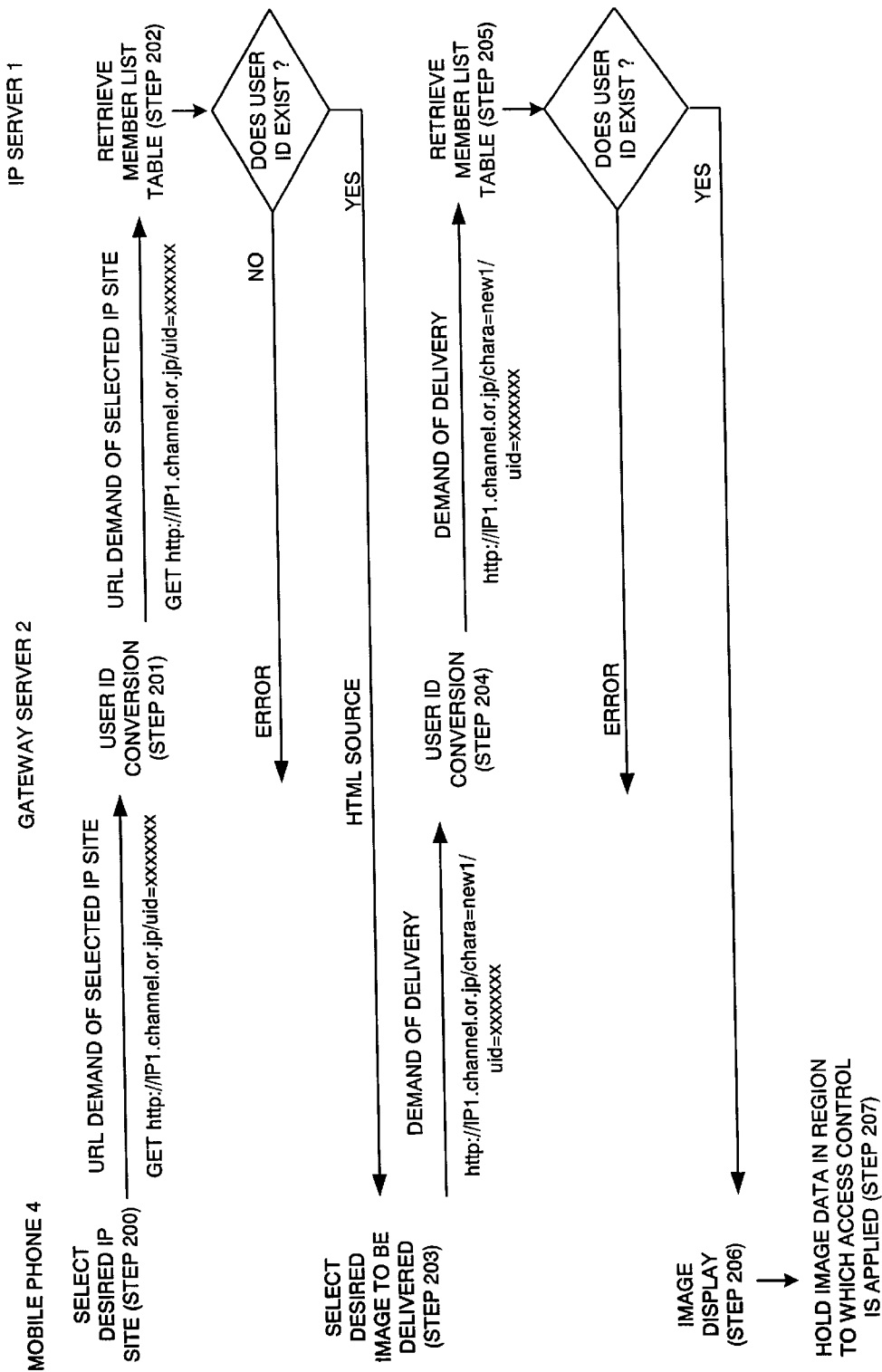
FIG. 11 is an operation flowchart of down-loading of an image in the first embodiment.

FIG. 11 is an operation flowchart showing the operation of image data delivery after the member registration.

First, a user of the mobile phone 4 operates the operating section 96 of the mobile phone 4, and selects a site of the IP server 1, in which the image delivery is conducted, and transmits an HTTP request (Step 200). In FIG. 11, it is shown that "GET http://IP1.channel.or.jp/uid=xxxxxxx" is transmitted from the mobile phone 4 as the HTTP request. In addition, as an example of the request, "IP1" indicates the IP server 1, "channel" indicates a demand of a menu of the image delivery, and "xxxxxxx" out of "uid=xxxxxxx" respectively.

In the gateway server 2 that received the request, a user ID corresponding to the intrinsic identifier of the mobile phone 4 is retrieved from the user ID list table 70, and the intrinsic identifier added to the received request is converted into the retrieved user ID, and is transmitted to the IP server 1 (Step 201). In this operation, since the intrinsic identifier added to the request from the mobile phone 4 is "xxxxxxx", if a user ID corresponding to this intrinsic identifier is retrieved from the user ID list table 70, the user ID is "abcdefgh". Accordingly, "xxxxxxx" is converted into "abcdefgh", and "GET http://IP1.channel.or.jp/uid=abcdefgh" is transmitted to the IP server 1.

In the IP server 1, whether or not "abcdefgh", which is the user ID, out of the received request "GET http://IP1.channel.or.jp/uid=abcdefgh" is already registered is checked by retrieving the member list table 31 (Step 202). Since, in the operation of the member registration, the user of the mobile phone 4 finished the member registration, the user ID is described in the member list table 31. Accordingly, an HTML source for the image delivery as a response is transmitted to the mobile phone 4 via the gateway server 2.

In the mobile phone 4, the response is received, and in accordance with instruction displayed on a screen, a request for a delivery of a desired image is transmitted (Step 203). For example, as the request from the mobile phone 4, it is assumed that "http://IP1.channel.or.jp/chara=new1/uid=xxxxxxx" is transmitted. In addition, it is assumed that "chara=new1" indicates discrimination information of a desired image to be delivered, and "new1" indicates an updated image, namely, an image data of a today's character. In the gateway server 2, the request "http://IP1.channel.or.jp/chara=new1/uid=xxxxxxx" from the mobile phone 4 is received, and by means of the operation same as the Step 201, namely, an intrinsic identifier is converted into a user ID, and is transmitted to the IP server 1 (Step 204).

In the IP server 1, the request from the mobile phone 4 is received, and in the same manner as Step 202, the member list table is retrieved, and if it is confirmed that it is a member, based on the discrimination information of an image data, which is described in the request, an image data held in the image folder 32 is read out, and is transmitted to the mobile phone 4 via the gateway server 2 (Step 205). In this operation, since the request is "http://IP1.channel.or.jp/chara=new1/uid=abcdefgh", the discrimination information of an image is "new1", and this indicates an image data of a today's character, and an image data is read from the image folder 321 for the day, and is transmitted to the mobile phone 4 via the gateway server 2.

In the mobile phone 4, the image data is received, and the received image data is held in the VRAM 92 and is displayed on the display (Step 206). On the other hand, in case that the down-loaded image data is displayed again, it is held in the region 99 of the storage section 95 (Step 207).

By means of the above operation, the image data of a character is down-loaded in the mobile phone 4. Also, even in case of storing the down-loaded image data, since the image data is held in the region of the storage section, to which access control by a user is applied, such actions that the stored image data is sent to others and is newly edited, which infringe a copyright, are not made.

A second embodiment will be explained.

At present, there are various kinds of mobile phones that are being sold, and they have various screen sizes and image data in various sizes, which can be displayed, respectively. Therefore, if only one kind of image data to be delivered is prepared, not only it is not exactly displayed, but there is a case in which it cannot be displayed at all, which depends on a sort of the mobile phone. Accordingly, in the second embodiment, it is characterized in that an image data in accordance with a sort of the mobile phone is prepared for the same contents, and a function for delivering an image data in accordance with the sort of the phone is added to the first embodiment. In addition, in the explanation of the second embodiment, the same numerals in the figures are attached to elements same as those in the first embodiment, and detailed explanation thereof will be omitted.

Figure 12:
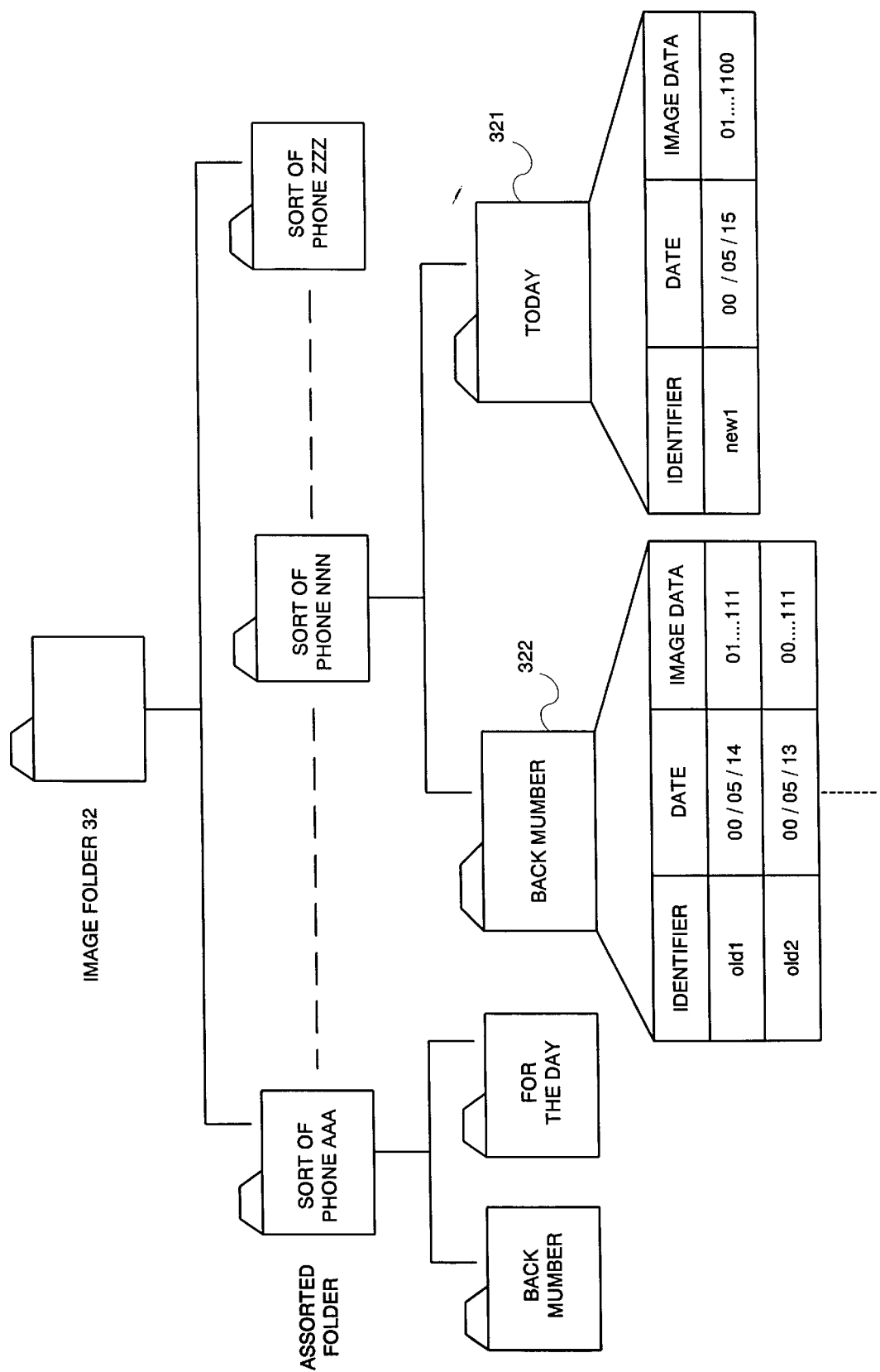
FIG. 12 is a view showing one example of an image folder in a second embodiment.

Presently, in each kind of services, when the mobile phone transmits a request, it transmits information on a sort of its own phone. Accordingly, in the second embodiment, it is constructed so that this information on the sort of the phone is determined in the IP server 1, and an image data in accordance with the sort of the phone is selected and delivered. Accordingly, as an image data to be prepared, as shown in FIG. 12, folders for each sort of phones are prepared in the image folder 32, and in the folder of each sort of the phones, an image data corresponding to its sort the phone is held. In FIG. 12, it is shown that the folders from a sort AAA of a phone to a sort ZZZ of a phone are provided, and that, in the folder of each sort of the phone, for example, a folder of a sort NNN of a phone, a folder in which an image data for the day is held, and a folder for a back number, in which a past image data is held, are provided. In addition, in the same manner, menus for an image delivery are prepared for every sort of a phone.

Below, operation in the arrangement will be explained.

Figure 13:
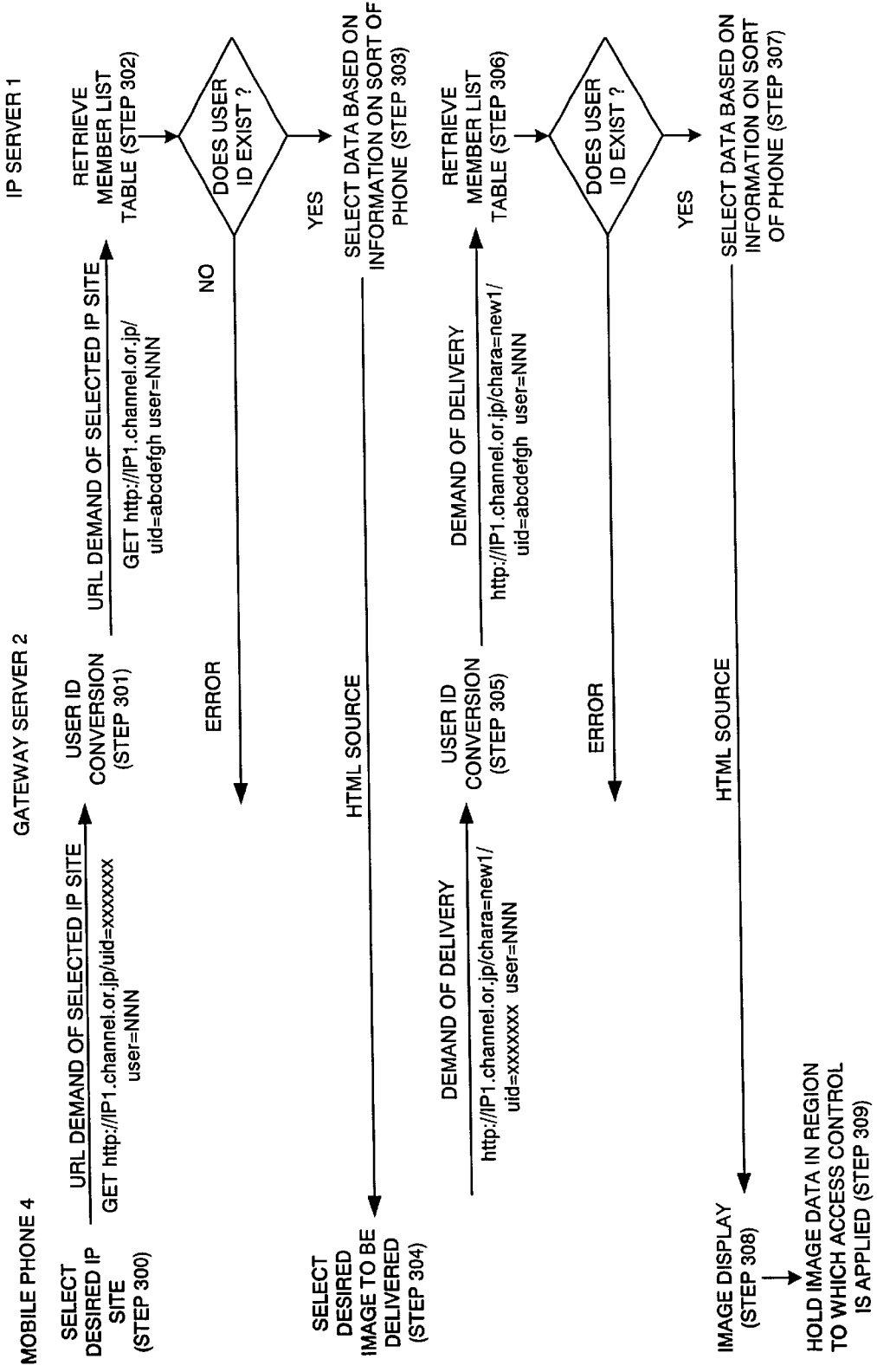
FIG. 13 is an operation flowchart of down-loading of an image in the second embodiment.

FIG. 13 is an operation flowchart showing the operation of an image data delivery for every sort of a phone.

Figure 14:
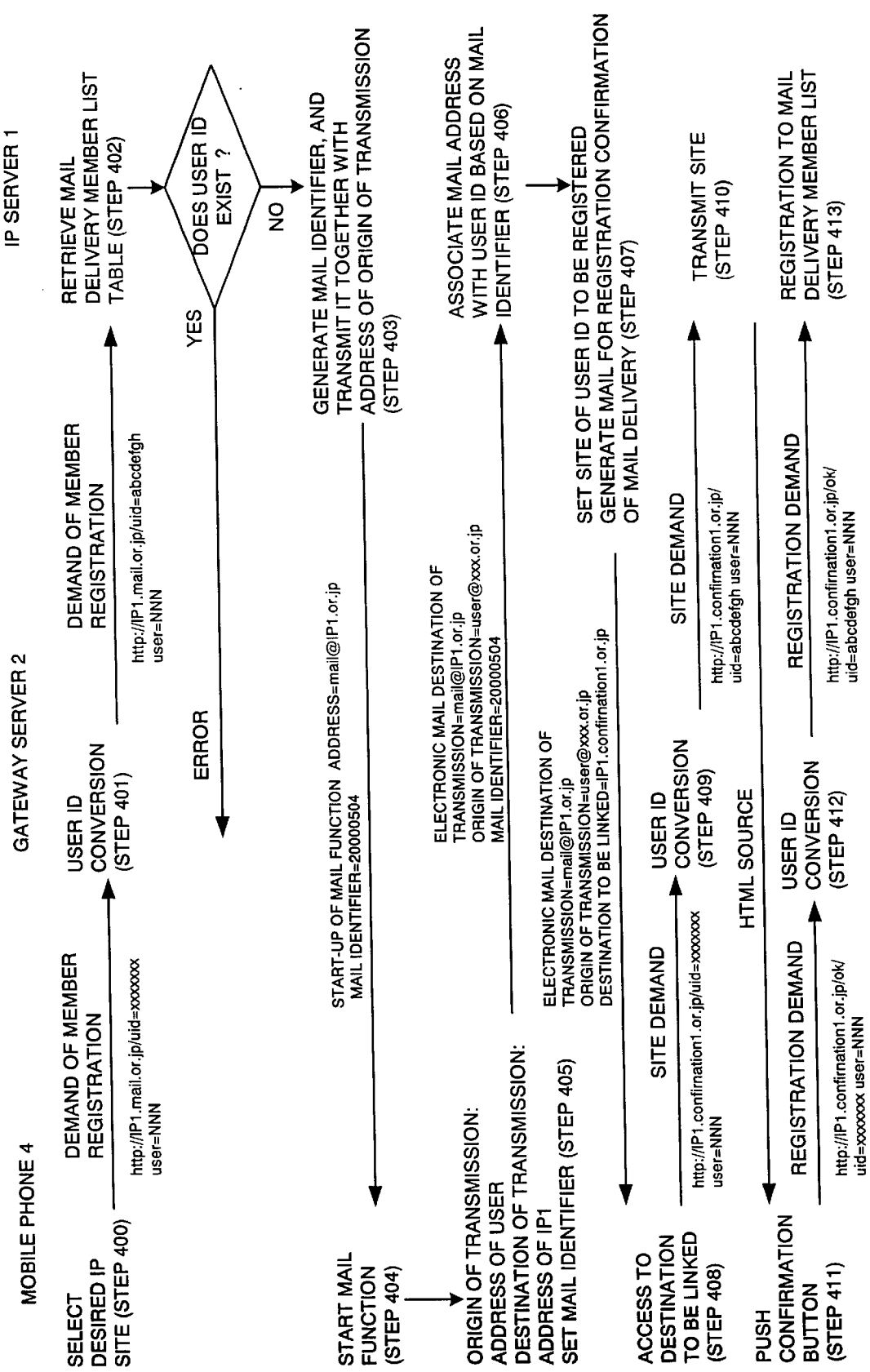
FIG. 14 is an operation flowchart of a member registration in a third embodiment.

First, a user of the mobile phone 4 operates the operating section 96 of the mobile phone 4, and selects a site of the IP server 1, in which the image delivery is conducted, and transmits an HTTP request (Step 300). In FIG. 14, it is shown that "GET http://IP1.channel.or.jp/uid=xxxxxxx user=NNN" is transmitted from the mobile phone 4 as the HTTP request. In addition, as an example of the request, "IP1" indicates the IP server 1, "channel" indicates a demand of a menu of an image delivery, "xxxxxxx" out of "uid=xxxxxxx" indicates an intrinsic identifier of the mobile phone 4, and "user=NNN" indicates a sort of the mobile phone 4, respectively.

In the gateway server 2 that received the request, a user ID corresponding to the intrinsic identifier of the mobile phone 4 is retrieved from the user ID list table 70, and the intrinsic identifier added to the received request is converted into the retrieved user ID, and is transmitted to the IP server 1 (Step 301). In this operation, since the intrinsic identifier added to the request from the mobile phone 4 is "xxxxxxx", if a user ID corresponding to this intrinsic identifier is retrieved from the user ID list table 70, the corresponding user ID is "abcdefgh". Accordingly, "xxxxxxx" is converted into "abcdefgh", and "GET http://IP1.channel.or.jp/uid=abcdefgh user=NNN" is transmitted to the IP server 1.

In the IP server 1, whether or not "abcdefgh" out of the received request "GET http://IP1.channel.or.jp/uid=abcdefgh user=NNN", which is a user ID, is already registered is checked by retrieving the member list table 31 (Step 302). Since, in the operation of the member registration, a user of the mobile phone 4 finished the member registration, the user ID is described in the member list table 31.

Accordingly, from the information "user=NNN" on the sort of the phone, an HTML source for the image delivery for the sort NNN of the phone as a response is transmitted to the mobile phone 4 via the gateway server 2 (Step 303).

In the mobile phone 4, the response is received, and in accordance with instruction displayed on a screen, a request for demanding a delivery of a desired image is transmitted (Step 304). For example, as the request from the mobile phone 4, it is assumed that "http://IP1.channel.or.jp/chara=new1/uid=xxxxxxx user=NNN" is transmitted. In addition, it is assumed that "chara=new1" out of the request to be transmitted indicates discrimination information of a desired image to be delivered, and "new1" indicates an updated image, namely, an image data of a today's character.

In the gateway server 2, the request "http://IP1.channel.or.jp/chara=new1/uid=xxxxxxx user=NNN" operation same as the Step 301, namely, an intrinsic identifier is converted into a user ID, and is transmitted to the IP server 1 (Step 305).

In the IP server 1, the request from the mobile phone 4 is received, and like at Step 302, the member list table is retrieved (Step 306). If it is confirmed that the requester is a member, the request moves from the information on the sort of the phone to the image folder for the sort of the phone, and further, based on the discrimination information of the image data, which is described in the request, the image data held in the image folder is read out, and is transmitted to the mobile phone 4 via the gateway server 2 (Step 307). In this operation, since the request is "http://IP1.channel.or.jp/chara=new1/uid=abcdefgh user=NNN", the information on a sort of a phone is "NNN", and the discrimination information of an image is "new1". This indicates an image data of a today's character for the sort NNN of the phone, and an image data is read from the image folder for the day for the sort NNN of the phone, and is transmitted to the mobile phone 4 via the gateway server 2.

In the mobile phone 4, the image data is received, and the received image data is held in the VRAM 92 and is displayed on the display (Step 308). On the other hand, in case that the down-loaded image data is displayed again, it is held in the region 99 of the storage section 95 (Step 309).

By means of the above operation, an image data that is the most suitable for the sort of a phone becomes to be delivered to the mobile phone 4, and inconvenience that an image data cannot be displayed in a certain sort of a phone can be avoided.

In addition, in the second embodiment, the information on the sort of the mobile phone 4 is constructed so as to be transmitted from the mobile phone 4. However, an arrangement can be adopted, wherein a table, in which information on a sort of the mobile phone 4 and an intrinsic identifier of the mobile phone 4 are described in association with each other, is previously prepared in the gateway server 2, and in case that a request is issued from the mobile phone 4, based on an intrinsic identifier added to the request, the information on the sort of the mobile phone 4 is retrieved from the table, and the retrieved information of the sort of the phone is added to the request, and is transmitted to the IP server 1.

Even though such an arrangement is adopted, since the IP server 1 can obtain the information on the sort of the mobile phone 4, which it needs, an image data suitable for the sort of the mobile phone can be selected.

A third embodiment will be explained.

Although it is already mentioned that, at present, the mobile phone can conduct transmission and reception of a data, by adapting this, each company can receive service of a so called electronic mail. On the other hand, the first embodiment and second embodiment are so called pull type service. Accordingly, in the third embodiment, a system for so called push type service is provided, wherein the system is constructed so that information of a daily updated image is notified to a user by an electronic mail, and an updated image data is down-loaded by means of an operation of a link by the user, which is set in the received electronic mail.

Also, in the third embodiment, since an electronic mail is used, like in the first embodiment and second embodiment, not only a web-interface, namely, a communication system of an HTTP (Hyper Text Transfer Protocol), but also a mail interface, namely, a communication system of an SMTP (Simple Mail Transfer Protocol) are used. Usually, in the communication system of the SMTP, the gateway server 2 does not add a user ID to an electronic mail. Accordingly, for maintaining a relationship with the user ID, specific processing is conducted.

Below, a system will be described according to the third embodiment. In addition, in the explanation of the third embodiment, the same numerals in the figures are attached to elements same as those in the first embodiment and the second embodiment, and detailed explanation thereof will be omitted.

In the third embodiment, provided in the IP server 1 are means for responding to a request from the mobile phone 4, based on the communication system of the HTTP, and starting an electronic mail function of the mobile phone 4 by using a function, such as a CGI scriptfor example. The IP server 1 further comprises means for generating a mail delivery list of members who desire a delivery of an electronic mail that has been transmitted from the mobile phone 4, and means for notifying the members of the electronic mail, which are described in the mail delivery list, based on the communication system of the SMTP.

Further, as mentioned above, since transmission and reception of an electronic mail are conducted by means of the communication system of the SMTP, the IP server 1 cannot obtain a user ID for discriminating users from the electronic mail. Accordingly, this embodiment is constructed so that means for generating a mail identifier which has a relationship in pairs with the obtained user ID is provided, and the generated mail identifier is set in an electronic mail to be transmitted, and is transmitted.

In addition, these means are realized in the MPU 24 of the IP server 1.

Below, the operation of the third embodiment will be explained. In addition, in the explanation of this operation, the operation of a member registration for utilizing mail delivery service and the operation for down-loading an image to the mobile phones 4 will be explained separately.

FIG. 14 is an operation flowchart showing the operation of the mail delivery member registration.

First, a user of the mobile phone 4 operates the operating section 96 of the mobile phone 4, and selects a site of the IP server 1, in which the member registration is conducted, and transmits an HTTP request based on the communication system of the HTTP (Step 400). In FIG. 14, it is shown that "http://IP1.mail.or.jp/uidxxxxxxx user=NNN" is transmitted from the mobile phone 4 as the HTTP request. In addition, as an example of the request, "IP1" indicates the IP server 1, "mail" indicates a menu screen of member registration, "xxxxxxx" out of "uid=xxxxxxx" indicates an intrinsic identifier of the mobile phone 4, and "user=NNN" indicates the sort of mobile phone.

In the gateway server 2 that received the request, since the request is one based on the communication system of the HTTP, a user ID corresponding to the intrinsic identifier of the mobile phone 4 is retrieved from the user ID list table 70, and the intrinsic identifier added to the received request is converted into the retrieved user ID, and is transmitted to the IP server 1 (Step 401). In this operation, since the intrinsic identifier added to the request from the mobile phone 4 is "xxxxxxx", if a user ID corresponding to this intrinsic identifier is retrieved from the user ID list table 70, the user ID corresponding to "xxxxxxx" is "abcdefgh". Accordingly, "xxxxxxx" is converted into "abcdefgh", and "http://IP1.mailmenu.or.jp/uid=abcdefgh user=NNN" is transmitted to the IP server 1.

In the IP server 1, whether or not the user ID "abcdefgh" out of the received request "http://IP1.mail.or.jp/uid=abcdefgh user=NNN" is already registered is checked by retrieving a mail delivery member list table 150. FIG. 15 is a view showing one example of the mail delivery member list table 150, and in the mail delivery member list table 150, a user ID of a member of the mail delivery service, an mail address of the member, and an admission date when the member registration was made are described contents by contents in association with each other. If a corresponding user ID is not described in the mail delivery member list table 150, the request of the member registration from the mobile phone 4 is received, and a response for starting a function of an electronic mail of the mobile phone 4, for example a program of a mailer by means of a CGI script and so forth is transmitted. At this time, an identifier having a relationship in pairs with the extracted user ID "abcdefgh", for example "200000504" is generated. And, this generated mail identifier "200000504" and a mail address which the IP server 1, for example "mail@zpl.or.jp" has are added to the response, and are transmitted (Step 403).

The above processing is conducted by means of the communication system of the HTTP.

In addition, since processing of Step 405 and Step 407 mentioned later is conducted by means of the communication system of the SMTP, explanation of the gateway server 2 will be omitted.

In the mobile phone 4, when the response is received, an electronic mail transmission and reception function is started (Step 404). And, a destination of transmission of an electronic mail is set to be a mail address "mail@IP1.or.jp", and an origin of transmission of the mail is set to be a mail address "user@xxx.or.jp" of a user (the mobile phone 4). Also, the received mail identifier "20000204" is set in a mail to be transmitted (Step 405). And, the mail in which these settings are made is transmitted based on the communication system of the SMTP.

In the IP server 1, an electronic mail from the mobile phone 4 is received, and a user ID is specified from the mail identifier "20000504" that is being set in the electronic mail. Further, a mail address of a user is specified from the origin "user@xxx.or.jp" of transmission of the electronic mail. Thereby, the user ID "abcdefgh" and "user@xxx.or.jp" are coupled to have a relationship in pairs with each other, and are stored (Step 406).

Successively, a site for confirming the member registration is prepared. This site for the confirmation is set so that only the mobile phone 4 having a user ID coupled to the mail address can have access thereto. And, the mail address of the user is set for an address of a destination of transmission of an electronic mail, and the B mail address of the IP server 1 is set for an origin of transmission, respectively, and a mail for confirming the member registration, in which a destination to be linked of a site for the exclusive use of a user ID is set, is generated (Step 407). In FIG. 14, it is shown that the mail address "user@xxx.or.jp" of the user is set for an address of a destination of transmission of an electronic mail, and the mail address "mail@IP1.or.jp" of the IP server 1 is set for an origin of transmission, respectively, and "IP1.confirmational.or.jp" is set for a destination to be linked of the site for the exclusive use of a user ID.

In the mobile phone 4, an electronic mail for registration confirmation is received, and if a registration of a mail delivery is desired, a link button which is being set in the received electronic mail is pushed, and an HTTP request by means of the communication system of the HTTP is transmitted (Step 408).

Since it is the HTTP request by means of the communication system of the HTTP, in the gateway server 2 that received the request, a user ID corresponding to an intrinsic identifier of the mobile phone 4 is retrieved from the user ID list table 70, and the intrinsic identifier added to the received request is converted into the retrieved user ID, and is transmitted to the IP server 1 (Step 409). In this operation, since the intrinsic identifier added to the request from the mobile phone 4 is "xxxxxxx", if a user ID corresponding to this intrinsic identifier is retrieved from the user ID list table 70, the user ID corresponding to "xxxxxxx" is "abcdefgh". Accordingly, "xxxxxxx" is converted into "abcdefgh", and "http://IP1.confirmational.or.jp/uid=abcdefgh user=NNN" is transmitted to the IP server 1.

In the IP server 1, the request is received, and an HTML source of the site is transmitted (Step 410).

In the mobile phone 4, the HTML source is received, and is displayed on a screen. If a registration thereof is desired, a "OK" button displayed on the screen is pushed, and a request of the member registration is transmitted (Step 411). In FIG. 14, it is shown that, as the HTTP request, "http://IP1.confirmational.or.jp/ok/uid=xxxxxxxx user=NNN" is transmitted.

Since it is the HTTP request by means of the communication system of the HTTP, in the gateway server 2 that received the request, a user ID corresponding to an intrinsic identifier of the mobile phone 4 is retrieved from the user ID list table 70, and the intrinsic identifier added to the received request is converted into the retrieved user ID, and is transmitted to the IP server 1 (Step 412). In this operation, since the intrinsic identifier added to the request from the mobile phone 4 is xxxxxxx , if a user ID corresponding to this intrinsic identifier is retrieved from the user ID list table 70, the user ID corresponding to "xxxxxxx" is "abcdefgh". Accordingly, "xxxxxxx" is converted into "abcdefgh", and "http://IP1.confirmational.or.jp/ok/uid=abcdefgh user=NNN"

In the IP server 1, in response to the request, the user ID and the mail address that are stored are registered in pairs in the mail delivery member list 150 (Step 413).

By means of the above operation, the member registration is completed.

In addition, in this explanation, for carefully confirming an intention of a registration of a mail delivery by a user, this embodiment is constructed so that, after the site for registration confirmation is linked, and the intention of the registration is confirmed again, the registration in the mail delivery member list 150 is made. However, without confirming the intention of the registration again, the operation for the registration may be finished at a time point when the electronic mail from a user is received. In other words, the process can be constructed so that; at Step 406, at a time point when the user ID and the mail address are coupled to have a relationship in pairs with each other, the mail address and the user ID are registered in pairs in the mail delivery member list 150. In this case, the processing after Step 407 becomes unnecessary.

Figure 16:
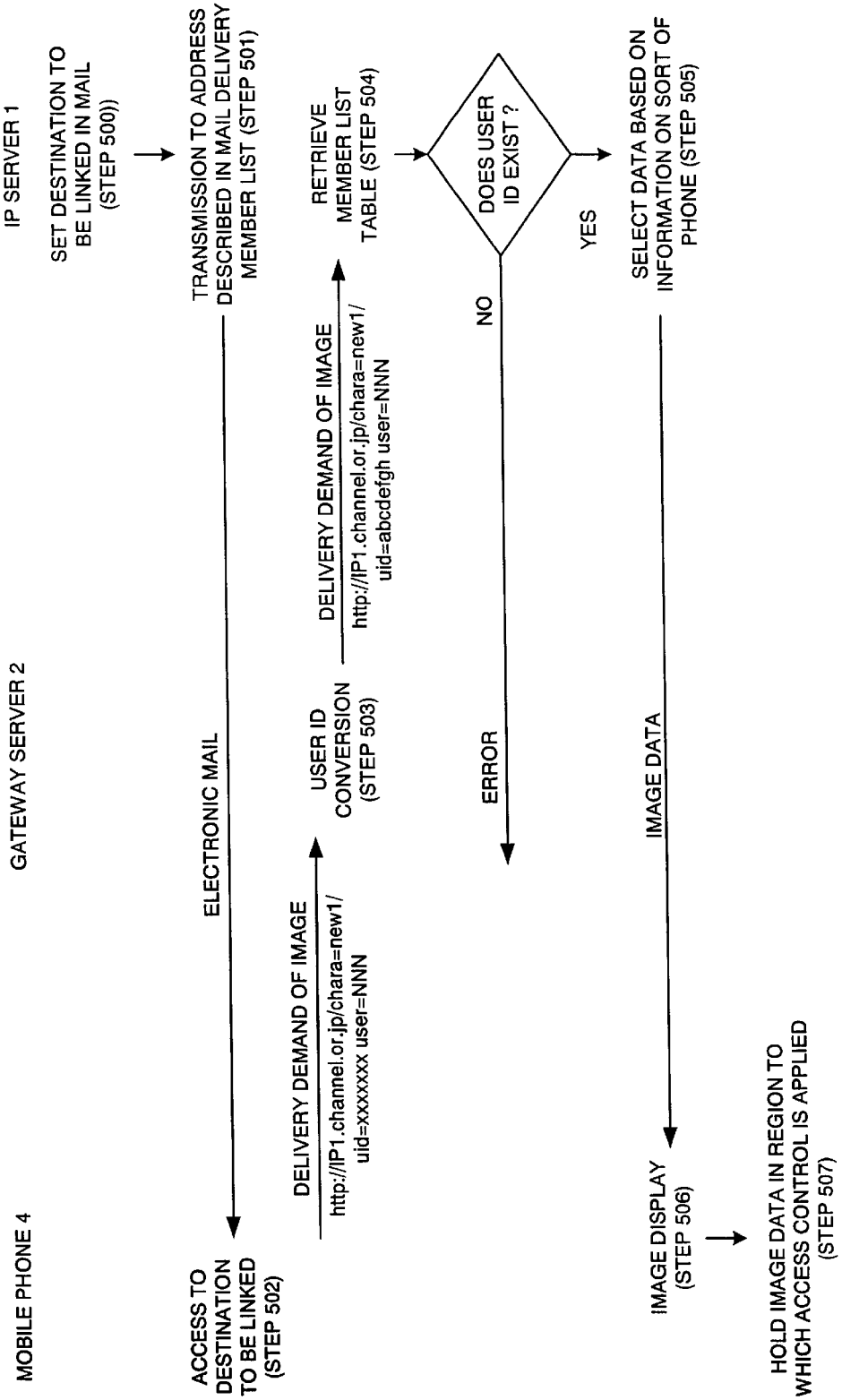
FIG. 16 is an operation flowchart of down-loading of an image in the third embodiment.

FIG. 16 is an operation flowchart showing the operation of image data delivery after member registration.

First, when an image to be delivered is added to the IP server 1, the IP server generates a mail in which a destination to be linked is set so that a folder in which the added updated image data is held, and an image are read out (Step 500). And, the generated mail is concurrently transmitted to a mail address described in the mail delivery member list table 150 (Step 501).

In the mobile phone 4, the mail is received, and when a link button that is being set in the electronic mail is pushed, a request is automatically transmitted (Step 502). For example, as the request from the mobile phone 4, it is assumed that "http://IP1.channel.or.jp/chara=new1/uid=xxxxxxx user=NNN" "chara=new1" out of the request to be transmitted is discrimination information of the added updated image, and "user=NNN" indicates a sort of the mobile phone 4, respectively. Also, the operation after that is subject to a web-interface.

In the gateway server 2, the request "http://IP1.channel.or.jp/chara=new1/uid=xxxxxxx user=NNN" identifier is converted into a user ID, and is transmitted to the IP server 1 (Step 503).

In the IP server 1, whether or not the user ID "abcdefgh" out of the received request "http://IP1.channel.or.jp/chara=new1/uid=abcdefgh user=NNN" is already registered is checked by retrieving the member list table 31 (Step 504). Since, in the operation of the member registration, the user of the mobile phone 4 finished the member registration, the user ID is described in the member list table 31. Accordingly, the request moves from information on a sort of the phone to an image folder for the sort of the phone, and further, based on the discrimination information of the image data, which is described in the request, the image data held in the image folder is read out, and is transmitted to the mobile phone 4 via the gateway server 2 (Step 505). In this operation, since the request is "http://IP1.channel.or.jp/chara=new1/uid=abcdefgn user=NNN", the information on a sort of a phone is user=NNN", and the discrimination information of an image is "new1". This indicates an image data of a today's character for the sort NNN of the phone, and an image data is read from the image folder for the day for the sort NNN of the phone, and is transmitted to the mobile phone 4 via the gateway server 2.

In the mobile phone 4, the image data is received, and the received image data is held in the VRAM 92 and is displayed on the display (Step 506).

On the other hand, in case that the down-loaded image data is displayed again, it is held in the region 99 of the storage section 95 (step 507).

What is claimed is:

1. An image delivering system comprising a mobile communication network, a plurality of mobile phones connected to the mobile communication network, a first server connected to the mobile phones via the mobile communication network, a network, and a second server connected to the first server via the network, wherein:

each of the mobile phones comprises:
- display means for displaying an image;
- storage means having an access-controlled region;
- member registration demand means for transmitting a member registration demand of image delivery service;
- image delivery demand means for transmitting a demand of an image delivery;
- image selecting means for transmitting image selection information for selecting a desired image data out of a plurality of image data that are held in the second server, and for downloading the desired image data;
- hold means for holding the downloaded image data in the access-controlled region of the storage means; and
- image controlling means for displaying the down-loaded image on the display means;

the first server comprises:
- a user identifier table wherein intrinsic identifiers of the mobile phones and user identifiers associated with each other;
- means for retrieving the user identifiers corresponding to the intrinsic identifiers of the mobile phones from the user identifier table, converting the intrinsic identifiers into user identifiers, and transmitting a demand from the mobile phone to the second server; and the second server comprises:
  storage means wherein a image data to be delivered is held;
  a member list table in which user identifiers of members of image delivery service are described;
  member registration means for, when receiving a member registration demand from the first server, determining whether a user identifier added to this member registration demand is described in the member list table, and describing the user identifier in the member list table if it is not present;
  image list transmitting means for, when receiving the image delivery demand, determining whether a user identifier added to this image delivery demand is described in the member list table, and transmitting a list of deliverable images if the user identifier is described in the member list table; and
  image delivering means for reading out image data indicated in the image selection information from the storage means, and for transmitting the read-out image data to the mobile phones.

2. The image delivering system as claimed in claim 1, wherein the image to be delivered is updated every day.

3. The image delivering system as claimed in claim 1, wherein:
  each of the mobile phones further comprises means for transmitting self-identifying sort information; and
  the second server further comprises:
    storage means in which an image data for every sort of mobile phone is stored; and
    image delivering means for reading out image data corresponding to information on the sorts of mobile phones from the storage means, and transmitting the image data to the mobile phones via the first server.

4. The image delivering system as claimed in claim 1, wherein:
  the first server further comprises:
    a table of sort information on the mobile phones, wherein the intrinsic identifiers of the mobile phones and sort information on the mobile phones are associated with each other; and
    means for, in response to a request for image delivery from the mobile phones, retrieving the information on the sorts of mobile phones from the table of information on the sorts of mobile phones, based on the intrinsic identifiers added to the request for image delivery, for adding this information on the sorts of mobile phones to the request for image delivery, and transmitting request for image delivery; and
  the second server further comprises:
    storage means wherein image data for every sort of mobile phone is stored; and
    image delivering means for reading out an image data from the storage means that corresponds to the information on the sorts of mobile phones, which is added to the request for image delivery, and for transmitting it to the mobile phones.

5. The image delivering system as claimed in claim 1, wherein:
  the second server further comprises
    an address table wherein electronic mail addresses of members are described;
    means for concurrently transmitting electronic mails that include a link destination downloading deliverable image data to electronic mail addresses described in the address table; and
    means for responding to access based on the link destination added to the electronic mails and transmitting the image data to the mobile phones; and
  each of the mobile phones further comprising:
    electronic mail transmitting and receiving means for transmitting and receiving an electronic mail;
    access means for receiving an electronic mail by means of the electronic mail transmitting and receiving means, and for having access to the link destination included in the electronic mail;
    image display controlling means for displaying an image downloaded from the link destination on the display means, and
    hold means for holding the image downloaded from the link destination in an access-controlled region of the storage means.

6. The image delivering system as claimed in claim 5, wherein:
  each mobile phone further comprises:
    member registration demand means for transmitting a member registration demand of mail delivery service;
    electronic mail transmitting means which is started by the second server; and
    means for setting a mail address of the second server, which is provided from the second server, in a destination to which an electronic mail will be transmitted, when the electronic mail transmitting means is started;
    means for setting a mail address of a user in an origin of transmission; and
    means for setting a mail identifier provided from the second server in an electronic mail and transmitting it to a destination of transmission; and
  the second server further comprises:
    means for, when receiving the member registration demand, generating a mail identifier which is associated with a user identifier of a member who transmitted the member registration demand;
    means for starting the electronic mail transmitting and receiving means of the mobile phones, and for transmitting the mail address and the mail identifier of the second server to the mobile phones; and
    means for receiving an electronic mail, for specifying a user identifier from the mail identifier that is set in the electronic mail, and for describing the specified user identifier and the mail address of a user in the address table in association with each other.

7. The image delivering system as claimed in claim 6, wherein each of the mobile phones further comprise:
  storage means having an access-controlled region; and
  hold means for holding a downloaded image data in the access-controlled region of the storage means.

8. An image delivering system comprising a mobile communication network, a plurality of mobile phones connected to the mobile communication network, a first server connected to the mobile phones via the mobile communication network, a network, and a second server connected to the first server via the network, wherein:
  the first server comprises means for connecting the mobile phones to the network;
  the second server comprises:

storage means for holding an image data;

an address table, wherein electronic mail addresses of members of image delivery service are described;

means for concurrently transmitting electronic mails that include a link destination pointing to a deliverable image data to electronic mail addresses described in the address table; and means for transmitting the image data to the mobile phones based on a link destination included in the electronic mails; and each of the mobile phones comprise:

display means for displaying an image;

electronic mail receiving means for receiving an electronic mail;

access means for receiving an electronic mail from the electronic mail receiving means and accessing the link destination included in the-electronic mail; and image display controlling means for displaying an image downloaded from the link destination on the display means.

9. The image delivering system as claimed in claim 8, wherein the image to be delivered from the link destination is an updated image.

10. The image delivering system as claimed in claim 8, wherein:

each of the mobile phones further comprise:

member registration demand means for transmitting a member registration demand of mail delivery service;

electronic mail transmitting means which is started by the second server; and means for including a mail address of the second server in a destination to which an electronic mail will be transmitted when the electronic mail transmitting means is started, for setting a mail address of a user in an origin of transmission, for including a mail identifier provided from the second server in an electronic mail, and for transmitting it to a destination of transmission; and the second server further comprises:

means for, when receiving the member registration demand, generating a mail identifier which has a relationship in pairs with a user identifier of a member who transmitted the member registration demand;

means for starting the electronic mail transmitting and receiving means of the mobile phones, and for transmitting the mail address and the mail identifier of the second server to the mobile phones; and means for receiving an electronic mail, for specifying a user identifier from the mail identifier that is included in the electronic mail, and for describing the specified user identifier and the electronic mail address of a user in the address table in association with each other.

11. The image delivering system as claimed in claim 8, wherein:

each of the mobile phones further comprises means for transmitting self-identifying sort information; and the second server further comprises:

storage means wherein image data for every sort of mobile phone is stored; and image delivering means for.reading out image data corresponding to soft information on the mobile phones from the storage means, and transmitting the read-out image data to the mobile phone.

12. The image delivering system as claimed in claim 8, wherein:

the first server further comprises:

a table of sort information of the mobile phones, wherein intrinsic identifiers of the mobile phones and sort information of the mobile phones are described in association with each other; and means for, in response to a demand from the mobile phones, retrieving the sort information of the mobile phones from the table of sort information, based on the intrinsic identifiers added to the demand, for adding this sort information of the mobile phones to the demand, and for transmitting it; and the second server further comprises:

storage means wherein an image data for every sort of mobile phone is stored; and image delivering means for reading out an image data from the storage means that corresponds to the sort information of the mobile phones, and for transmitting it to the mobile phones.

13. An image delivering method using a network system comprising a mobile communication network, a plurality of mobile phones connected to the mobile communication network, a first server connected to the mobile phones via the mobile communication network, a network, and a second server connected to the first server via the network, wherein the method comprises:

setting, at the first server, in response to a request for image delivery from a mobile phone, a user identifier corresponding to an intrinsic identifier of the mobile phones in the request for image delivery, and transmitting the request for image delivery to the second server;

receiving, at the second server the request for image delivery from the first server, determining if an image can be delivered tote user identified in the request for image delivery, and, if the user is authorized to receding delivery, transmitting a requested image data to the mobile phone; and receiving the image data at the mobile phone, and storing the received image data in access restricted storage region.

14. The image delivering method recited in claim 13, wherein the image to be delivered is updated every day.

15. The image delivering method as claimed in claim 13, wherein the method further comprises:

storing image data corresponding to every sort of mobile phones in the second server;

adding information on the sort of mobile phone when transmitting a request for image delivery from a mobile phone; and delivering image data from the second server to the mobile phone that corresponds to the sort of the mobile phone.

16. The image delivering method as claimed in claim 13, wherein the method further comprises:

generating a table of sort information of the mobile phones in the first server, wherein the intrinsic identifiers of the mobile phones and the sort information of the mobile phones are associated with each other;

storing image data for every sort of mobile phone in the second server;

retrieving, at the first server, in response to a request from the mobile phones, information on the sorts of the mobile phones from the table of information on the sorts of mobile phones, based on the intrinsic identifiers added to the request for image delivery, and adding this information on the sorts of the phones to the request for image delivery, and transmitting the request for image delivery to the second server; and delivering, at the second server, image data corresponding to the information on the sorts of mobile phones to the mobile phone based on the information on the sorts of mobile phones, which was added to the request for image delivery.

17. The image delivering method as claimed in claim 13, wherein the method further comprises:

providing an address table in the second server, wherein electronic mail addresses of members are stored;

transmitting electronic mails from the second server, wherein a link destination for downloading a deliverable image data is sent to addresses described in the address table;

receiving an electronic mail that provides access to the link destination;

downloading image data form the link destination; and displaying the downloaded image data.

18. The image delivering method as claimed in claim 17, wherein the method further comprises:

transmitting a registration request from a mobile phone to request an electronic mail address;

setting, at the first server, a user identifier in the registration request;

generating, at the first server, a presumptive identifier which has a relationship in pairs with the user identifier that is set in the registration request;

transmitting the presumptive identifier and the electronic mail addresses of the second server to the mobile phone;

starting an electronic mail function in the mobile phone;

setting an electronic mail address of a user in an origin of transmission of an electronic mail on the mobile phone;

setting the electronic mail address of the second server in a destination to which the electronic mail is transmitted, and setting the presumptive identifier in the electronic mail;

transmitting the electronic mail in which the presumptive identifier is set from the mobile phone;

the second server extracting the presumptive identifier from the electronic mail, and retrieving a user identifier which is associated with the presumptive identifier; and registering the electronic mail address of a user, which is described in an origin of transmission of the received electronic mail, and retrieved user identifier in the address table in pairs.

19. An image delivering method using a network system comprising a mobile communication network, a plurality of mobile phones connected to the mobile communication network, a first server connected tore mobile phones via the mobile communication network, a network, and a second server connected to the first server via the network, wherein the method comprises:

concurrently transmitting electronic mails in which a link destination for downloading an image to be delivered to previously registered electronic mail addresses that are destinations of the transmission;

receiving an electronic mail and requesting delivery of an image to the link destination;

setting, at the first server, in response to a request for image delivery from a mobile phone, a user identifier corresponding to an intrinsic identifier of the mobile phone in request for image delivery, and transmitting the request for image delivery to the second server;

receiving, at the second server, the request from the first server, determining if an image can be delivered to the user identified in the request for image delivery, and, if the user is authorized to receive image delivery, transmitting a requested image data to the mobile phone; and receiving the image data at the mobile phone and displaying the received image data.

20. The image delivering method claimed in claim 19, wherein the received image data is stored in an access-controlled storage region.

21. The image delivering method claimed in claim 19, wherein the image to be delivered is updated every day.

22. The image delivering method claimed in claim 19, the method further comprising:

storing image data corresponding to every sort of mobile phones in the second server;

adding information on the sort of mobile phone when transmitting a request for image delivery from a mobile phone; and delivering image data from the second server to the mobile phone that corresponds to the sort of the mobile phone.

23. An image delivering method recited in claim 19, characterized in that the method further has:

generating a table of sort information of the mobile phones in the first server, wherein the intrinsic identifiers of the mobile phones and the sort information of the mobile phones are associated with each other;

storing image data for every sort of mobile phone in the second server;

retrieving, at the first server, in response to a request from the mobile phones, information on the sorts of the mobile phones from the table of information on the sorts of mobile phones, based on the intrinsic identifiers added to the request for image delivery, and adding this information on the sorts of the phones to the request for image delivery, and transmitting the request for image delivery to the second server; and delivering, at the second server, image data corresponding to the information on the sorts of mobile phones to the mobile phone based on the information on the sorts of mobile phones, which was added to the request for image delivery.

24. An image delivering method recited in claim 19, characterized in that the method has:

transmitting a registration request from a mobile phone to request an electronic mail address;

the first server setting a user, identifier in the registration request;

generating, at the second server, a presumptive identifier which has a relationship in pairs with the user identifier that is set in the registration request;

transmitting the presumptive identifier and the electronic mail addresses of the second server to the mobile phone;

starting an electronic mail function in the mobile phone;

setting an electronic mail address of a user in an origin of transmission of an electronic mail on the mobile phone;

setting the electronic mail address of the second server in a destination to which the electronic mail is transmitted, and setting the presumptive identifier in the electronic mail;

transmitting the electronic mail in which the presumptive identifier is set from the mobile phone;

extracting, at the second server, the presumptive identifier from the electronic mail, and retrieving a user identifier which is associated with the presumptive identifier; and registering the electronic mail address of a user, which is described in an origin of transmission of the received electronic mail, and retrieved user identifier in the address table in pairs.

25. A method of acquiring electronic mail addresses in accordance with terminal identifiers, wherein terminals, and a second server connected to the terminals via a first server are provided, and wherein a first communication method in which the second server discriminates the terminals based on the terminal identifiers of the terminals, which are issued from the first server, and a second communication method in which the second server discriminates the terminals based on electronic mail addresses of the terminals coexist, the method further comprising:

transmitting a registration demand for an electronic mail address from a terminal based on the first communication method;

setting, at the first server, a terminal identifier in the registration demand;

generating, at the second server, a presumptive identifier which has a relationship in pairs with the terminal identifier that is set in the registration demand;

transmitting the presumptive identifier and electronic mail address of the second server to the terminal using on the first communication method;

starting an electronic mail function on the terminal;

setting an electronic mail address of the terminal in an origin of transmission of an electronic mail on the terminal;

setting the electronic mail address of the second server in a destination to which the electronic mail is transmitted setting the presumptive identifier in the electronic mail;

transmitting the electronic mail from the terminal using the second communication method;

extracting, at the second server, the presumptive identifier from the received electronic mail, and retrieving a terminal identifier which has a relationship in pairs with the presumptive identifier; and storing the electronic mail address of the terminal, which is described in an origin of transmission of the received electronic mail, and the retrieved terminal identifier in association with each other.

26. The method of acquiring electronic mail addresses as claimed in claim 25, wherein the terminal identifiers of the terminals are used for the presumptive identifier.

27. A method of storing terminal identifier information and electronic mail address information in a second server in association with each other, wherein terminals, and the second server connected to the terminals via a first server are provided, and wherein a first communication method in which the second server obtains the terminal identifier information with which the first server provides the terminals, and a second communication method in which the second server obtains the electronic mail address information of the terminals coexist, the method further comprising:

receiving, at the second server, a registration demand for an electronic mail address and terminal identifier information using the first communication method;

transmitting, via the first server, the presumptive identifier information corresponding to the terminal identifier information and electronic mail address information of the second server to the terminals from the second server using on the first communication method;

starting an electronic mail function for the terminal;

setting the electronic mail address information of the terminal in an origin of transmission of an electronic mail from the terminal;

setting the electronic mail address information of the second server in a destination to which the electronic mail is transmitted;

setting the presumptive identifier information in the electronic mail;

receiving, at the second server, the electronic mail from the terminal based on the second communication method;

extracting the presumptive identifier information from the electronic mail received in the second server;

obtaining terminal identifier information corresponding to the presumptive identifier information; and storing the electronic mail address information of the terminals, which is described in an origin of transmission of the received electronic mail, and the terminal identifier in association with each other.

28. The method of storing the terminal identifier information and electronic mail address information in the second server in association with each other as claimed in claim 27, wherein the terminal identifier information of the terminals is used for the presumptive identifier information.

29. An image delivering system having a mobile communication network, a plurality of mobile phones connected to the mobile communication network, a first server connected to the mobile phones via the mobile communication network, a network, and a second server connected to the first server via the network, wherein:

each of the mobile phones composes:
a processor;
a display;
a memory, wherein a portion of the memory is access controlled; and
a transmitter-receiver;

the first server comprises:
a processor;
a user identifier table wherein a plurality of intrinsic identifiers assigned to the plurality of the mobile phones is associated with a plurality of user identifiers of image delivery service members; and the second server comprises:
a processor;
an image memory; and
a member list table comprising user identifiers of members of image delivery service.

30. The image delivering system as claimed in claim 29, wherein the image to be delivered is updated every day.

31. The image delivering system as claimed in claim 29, wherein:

the transmitter-receiver of each mobile phone transmits sort information; and the image memory of the second server stores image data for each sort of the mobile phone, and the processor of the second server is configured to read image data corresponding to the sort information from the image memory and forwarding it to the first server.

32. The image delivering system as claimed in claim 29, wherein:

the first server further comprises a mobile phone sort information table, wherein the intrinsic identifiers of each mobile Shone and the sort information on each of the mobile phones are associated; and the processor of the f first server, in response to a demand from a mobile phone, retrieves sort information from the mobile phone sort information table based on the intrinsic identifiers included in the demand; and the image memory of the second server stores image data for each sort of mobile phone and the processor of the second server is configured to read out image data corresponding to the sort information from the image memory and to transmit the image data to the mobile phones.

33. The image delivering system as claimed in claim 29, wherein:

the second server comprises an address table comprising electronic mail addresses of image delivery service members, and the processor of the second server is configured to transmit electronic mail messages that include a link destination to deliverable image data to electronic mail addresses described in the address table, and to respond to an access demand based on a link destination included in the electronic mail messages; and the processor of each of the mobile phones is configured to:

transmit and receive electronic mail messages through the transmitter-receiver;

access a link destination contained in an electronic mail message; and retrieve image data from the link destination and store in the access-controlled portion of the memory; and display the retrieved image data on the display.

34. The image delivering system as claimed in claim 33, wherein:

the processor of each of the mobile phones is further configured to transmit a member registration demand for mail delivery service through the transmitter-receiver, to activate the transmission of electronic mail messages upon receipt of a command from the second server, and to include a mail address of the second server in a destination to which an electronic mail will be transmitted, to set a mail address of a user in an origin of transmission, to set a mail identifier provided from the second server in electronic mail message; and to transmit it to a destination of transmission, and the processor of the second server is further configured to:

generate a mail identifier that corresponds to the user identifier of a member who transmitted the member registration demand, send a command to activate the transmission of electronic mail messages by the mobile phones, transmit the mail address and the mail identifier of the second server to the mobile phones, and receive an electronic mail message and specify a user identifier from the mail identifier that is included in the electronic mail message; and describe the specified user identifier and the mail address of a user which is included in the electronic mail message in the address table in association with each other.

35. The image delivering system as claimed in claim 29, wherein the transmitter-receiver transmits member registration demands for image delivery service, image delivery demands, and image selection information that selects desired image data from a plurality of image data.

36. The image delivering system as claimed in claim 35, wherein the transmitter-receiver receives a transmission of selected image data.

37. The image delivering system as claimed in claim 36, wherein the processor loads the transmitted image data into the access-controlled portion of the memory.

38. The image delivering system as claimed in claim 37, wherein the processor displays the transmitted image data stored in the access-controlled portion of the memory on the display.

39. The image delivering system as claimed in claim 29, wherein the processor of the first server converts an intrinsic identifier of one of the mobile phones into its associated user identifier.

40. The image delivering system as claimed in claim 29, wherein the processor of the first server forwards an image delivery demand from at least one of the mobile phones to the second server.

41. The image delivering system as claimed in claim 29, wherein the processor of the second server adds a user identifier to the member list table according to a member registration demand received from the first server.

42. The image delivering system as claimed in claim 35, wherein the processor of the second server reads out selected image data from the image data memory as indicated by the image selection information transmitted by a mobile phone.

43. The image delivering system as claimed in claim 35,wherein the processor of the second server forwards a list of deliverable images to the first server in response to an image delivery demand that includes a user identifier described in the member list table.

44. An image delivering system having a mobile communication network, a plurality of mobile phones connected to the mobile communication network, a first server connected to the mobile phones via the mobile communication network, a network, and a second server connected to the first server via the network, wherein:

the first server comprises an interface for connecting the mobile phones to the network, the second server comprises:

a processor an image memory for image data;

an address table describing electronic mail addresses of image delivery service members;

wherein the processor is adapted to concurrently transmit electronic mail messages that include a link destination pointing to a deliverable image data to electronic mail addresses described in the address table, and to transmit image data to the mobile phones based on the link destination included in the electronic mail messages; and each of the mobile phones further comprise:

a processor;

a display;

an electronic mail receiver;

a display controller that controls the display of image data;

wherein the processor is configured to access the link destination included in the electronic mail messages, download image data from the link destination and forward it to the display controller.

45. The image delivering system as claimed in claim 44, wherein the image to be delivered from the destination to be linked is an updated image.

46. The image delivering system as claimed in claim 44, wherein the processor in each mobile phone is further adapted to:

transmit a member registration demand of mail delivery service;

start an electronic mail function when commanded by the second server;

set a mail address of the second server in a destination to which an electronic mail message will be transmitted;

set a mail address of a user in an origin of transmission;

set a mail identifier provided from the second server in the electronic mail message; and transmit the electronic mail message to a destination of transmission; and the processor of the second server is further configured to:
when receiving the member registration demand, generate a mail identifier that is associated with a user identifier of a member who transmitted the member registration demand;
command each mobile phone to begin its electronic mail function;
transmit the mail address and the mail identifier of the second server to each of the mobile phones;
receive an electronic mail message;
specify a user identifier from the mail identifier that included in the electronic mail message; and
describe the specified user identifier and the mail address of a user that is included in the electronic mail message in the address table in association with each other.

47. The image delivering system as claimed in claim 44, wherein:

the processor of each mobile phone is further configured to transmit self-identifying sort information; and the second server further comprises:
image memory that stores image data for each sort of mobile phone; and
wherein the process or of the second server is further configured to read out image data from the image memory that corresponds to sort information of the mobile phones, and is further configured to transmit the image data to the mobile phones.

48. The image delivering system as claimed in claim 44, wherein:

the first server further comprises:
a table of sort information on the mobile phones, wherein intrinsic identifiers of the mobile phones and sort information on the mobile phones are associated with each other; and
the processor of the first server is further configured to, in response to a demand from the mobile phones, retrieving he sort information on the mobile phones from the sort table of information based on the intrinsic identifiers added to the demand, and to add the retrieved sort information to the demand, and to transmit it; and the second server further comprises:
image memory that stores image data for each sort of mobile phone; and
wherein the processor of the second server is further configured to read out image data from the image memory that corresponds to sort information of the mobile phones, and is further configured to transmit the image data to the mobile phones.

49. The image delivering system as claimed in claim 44, wherein each of the mobile phones further comprise a memory, wherein a portion of the memory is access controlled, and wherein the processor in each of the mobile phones is further configured to load transmitted image data into the access-controlled portion of the memory.

* * * * *